(12) United States Patent
Dunlop et al.

(10) Patent No.: US 7,128,167 B2
(45) Date of Patent: Oct. 31, 2006

(54) SYSTEM AND METHOD FOR RIG STATE DETECTION

(75) Inventors: Jonathan Dunlop, Cambridge (GB); William Lesso, Cambridge (GB); Walt Aldred, Thriplow (GB); Richard Meehan, Sugar Land, TX (US); Matthew Richard Orton, Cambridge (GB); William John Fitzgerald, Cambridge (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 401 days.

(21) Appl. No.: 10/400,125

(22) Filed: Mar. 26, 2003

(65) Prior Publication Data

US 2004/0124012 A1    Jul. 1, 2004

Related U.S. Application Data

(63) Continuation-in-part of application No. 10/330,634, filed on Dec. 27, 2002, now abandoned.

(51) Int. Cl.
*E21B 44/00* (2006.01)

(52) U.S. Cl. ............................ 175/24; 175/45; 702/9

(58) Field of Classification Search ................ 175/24, 175/25, 26, 27, 38, 40, 45, 48; 702/9; 73/152.43
See application file for complete search history.

(56) References Cited

U.S. PATENT DOCUMENTS

| | | | |
|---|---|---|---|
| 3,605,919 A | | 9/1971 | Bromell et al. |
| 4,537,067 A | * | 8/1985 | Sharp et al. ............. 73/152.13 |
| 4,606,415 A | * | 8/1986 | Gray et al. .................. 175/24 |
| 4,685,329 A | | 8/1987 | Burgess |
| 5,465,798 A | * | 11/1995 | Edlund et al. ............... 175/24 |
| 5,654,503 A | * | 8/1997 | Rasmus ................... 73/152.43 |
| 5,952,569 A | | 9/1999 | Jervis et al. |
| 6,155,357 A | * | 12/2000 | King et al. .................... 175/27 |
| 6,233,524 B1 | | 5/2001 | Harrell et al. |
| 6,438,495 B1 | | 8/2002 | Chau et al. |
| 6,662,110 B1 | * | 12/2003 | Bargach et al. ............... 702/6 |
| 6,760,665 B1 | * | 7/2004 | Francis ........................ 702/6 |
| 6,892,812 B1 | * | 5/2005 | Niedermayr et al. ... 166/250.15 |

FOREIGN PATENT DOCUMENTS

| | | |
|---|---|---|
| EP | 0 939 195 A2 | 9/1999 |
| EP | 0 939 195 A3 | 11/1999 |
| GB | 2 341 685 A | 7/1999 |

(Continued)

OTHER PUBLICATIONS

Aldred et al Managing drilling risk Oilfield Review, Summer 1999.

(Continued)

*Primary Examiner*—Jennifer H. Gay
*Assistant Examiner*—Daniel P Stephenson
(74) *Attorney, Agent, or Firm*—Steven Gahlings; Jody Lynn DeStefanis; Dale Gaudier

(57) ABSTRACT

A method and system is disclosed for automatically detecting the state of a drilling rig during the drilling process of a wellbore. Two or more, but preferably four independent input data channels are received, each input data channel representing a series of measurements made over time during the drilling process. Based on the input channels the most likely state of the drilling rig is detected from at least three possible rig states. The detection method is preferably probabilistic and even more preferably based on particle filtering techniques. The preferred systems and methods disclosed are also capable of detecting events and displaying or notifying drilling personnel of the detected events and suggesting corrective action.

67 Claims, 10 Drawing Sheets

FOREIGN PATENT DOCUMENTS

WO          01/25823 A1     4/2001
WO         03/100216 A1    12/2003

OTHER PUBLICATIONS

Bourgois et al The MDS system: Computers transform drilling Oilfield Review, vol. 2, No. 1, 1990.

Burgess et al Measuring the wear of milled tooth bits using MWD torque and weight-on-bit SPE/IADC 13475, 1985.

Carpenter et al Building robust simulation-based filters for evolving data sets Technical report, Department of Statistics, University of Oxford, 1998.

Chevallier et al MDS system increases drilling safety and efficiency Petroleum Engineer International, No. 9, 1989, pp. 16-24.

Fearnhead Sequential Monte Carlo methods in filter theory Department of Statistics, University of Oxford, 1998, Chapter 5, pp. 72-107.

Hargreaves et al Early kick detection for deepwater drilling: new probabilistic methods applied in the field SPE 71369, 2001.

Kennedy et al Statistical Computing Marcel Dekker, New York, 1980, chapter 6, pp. 133-264.

Varco Company—Instrumentation Varco's Integrated Control and InformationSystem Pre Dec. 2002.

Varco systems—Drill Rig Equipment Electronic driller features Pre Dec. 2002.

Washout Alarm Schlumberger Drilling and Measurement overview flier Pre Dec. 2002.

Hutchison et al, An MWD downhole assistant driller, SPE Proceedings, vol. 30523, 1995, pp. 743-752.

* cited by examiner

SYSTEM AND METHOD FOR RIG STATE DETECTION

This Application is a Continuation-In-Part of U.S. application Ser. No. 10/330,634, filed Dec. 27, 2002, now abandoned.

FIELD OF THE INVENTION

The present invention relates to the field of drilling technology in oilfield applications. In particular, the invention relates to a system and method for automatically detecting the state of a drilling rig.

BACKGROUND OF THE INVENTION

In oilfield applications, the drilling process can be impeded by a wide variety of problems. Accurate measurements of downhole conditions, rock properties and surface equipment allow many drilling risks to be minimized, but they are also crucial for detecting that a problem has occurred. At present, most problem detection is the result of human vigilance, but detection probability is often degraded by fatigue, high workload or lack of experience.

Some limited techniques have been used for detecting one of two possible rig states, but generally these have only used a single input channel. In one example, a technique is used to automatically detect if the drill pipe is "in slips" or "not in slips". This information is used in gaining accurate control of depth estimates, for example in conjunction with activities such as measurement-while-drilling (MWD or mud logging. To tell whether the drill pipe is "in slips" the known technique generally only uses a single input channel measured on the surface: Hookload. Another example is a technique used to predict if the drill bit is "on bottom" or "not on bottom." Similarly, this method makes use of only a single input channel, namely block position, and is only used to detect one of two "states" of the drilling rig.

Known event detection systems have depended upon the drilling personnel to identify the rig state. For example see, "*The MDS System: Computers Transform Drilling*", Bourgois, Burgess, Rike, Unsworth, Oilfield Review Vol. 2, No. 1, 1990, pp.4–15, and "*Managing Drilling Risk*" Aldred et al., Oilfield Review, Summer 1999, pp. 219.

SUMMARY OF THE INVENTION

Thus, it is an object of the present invention to provide a system and method for automatic rig state detection that makes use of multiple input channels to detect one of several distinct rig states.

It is also an object of the present invention to provide a system and method of drilling event detection based on automatic rig state detection.

According to the invention a method is provided for drilling while automatically detecting the state of a drilling rig during the drilling process of a wellbore comprising the following steps. Receiving two or more independent input data channels, each input data channel representing a series of measurements made over time during the drilling process. And, automatically detecting the most likely state of the drilling rig from at least three possible rig states, the detection based on the two or more input channels. Activity relating to drilling is preferably altered based on the detection of the most likely state of the drilling rig.

The method preferably makes use of three or more independent input channels which are preferably selected from the following: hookload, block position, torque and stand pipe pressure. The set of possible rig states preferably includes at least 6 states, and even more preferably, more than 10 possible states. The method also preferably generates a probability of each possible rig state.

The algorithm used in automatically detecting the most likely state is preferably probabilistic in nature, and is even more preferably based on particle filtering techniques.

The method preferably includes event detection based on the automatically detected rig state. The event detection is preferably automatic. The method preferably either notifies the drilling personnel of the detected event and/or suggests corrective action.

The present invention is also embodied in a system for drilling while automatically detecting the state of a drilling rig during the drilling process of a wellbore, and a computer readable medium capable of causing a computer system to carry out the following steps during a the drilling process of a wellbore.

As used herein, the phrases "rig states" or "states of the rig" refers to intentional actions taking place in a drilling system during the drilling process. Further the set of rig states are preferably defined such that they are mutually exclusive.

As used herein the phrase "drilling process" refers to the entire phase of wellbore construction relating to drilling the wellbore, including the operations commonly known as tripping, reaming, rotary drilling, slide drilling and running casing.

DETAILED DESCRIPTION OF THE INVENTION

According to the invention, it has been recognized that the signatures that may lead to the accurate detection of many drilling events are spread across multiple surface and downhole channels with low signal-to-noise ratios. Additionally, many of the routine actions of the driller could be mistaken for problems unless the system is analyzed as a whole. According to the invention, it has been found that by automatically detecting the drilling rig activity or 'rig state' in real-time, this rig state information can be fed into problem detection algorithms thereby greatly increasing the accuracy of such algorithms.

The following notation is used in the description of the invention:

| | |
|---|---|
| BHA | Bottom hole assembly |
| BPOS | Block position |
| BVEL | Block velocity |
| DEPT | Bit depth |
| HKLD | Hookload |
| HMM | Hidden Markov model |
| IDEAL ™ | Integrated Drilling Evaluation and Logging |
| LWD | Logging while drilling |
| MWD | Measurement while drilling |
| POOH | Pull out of hole |
| PPF | Parametric particle filter |
| RIH | Run in hole |
| RPM | Revolutions per minute |
| SPIN-DR | Stuck Pipe Investigation, Diagnosis and Recommendation - SPIN Doctor ™ |
| SPPA | Standpipe pressure |
| TQA | Torque |

Figure 1:
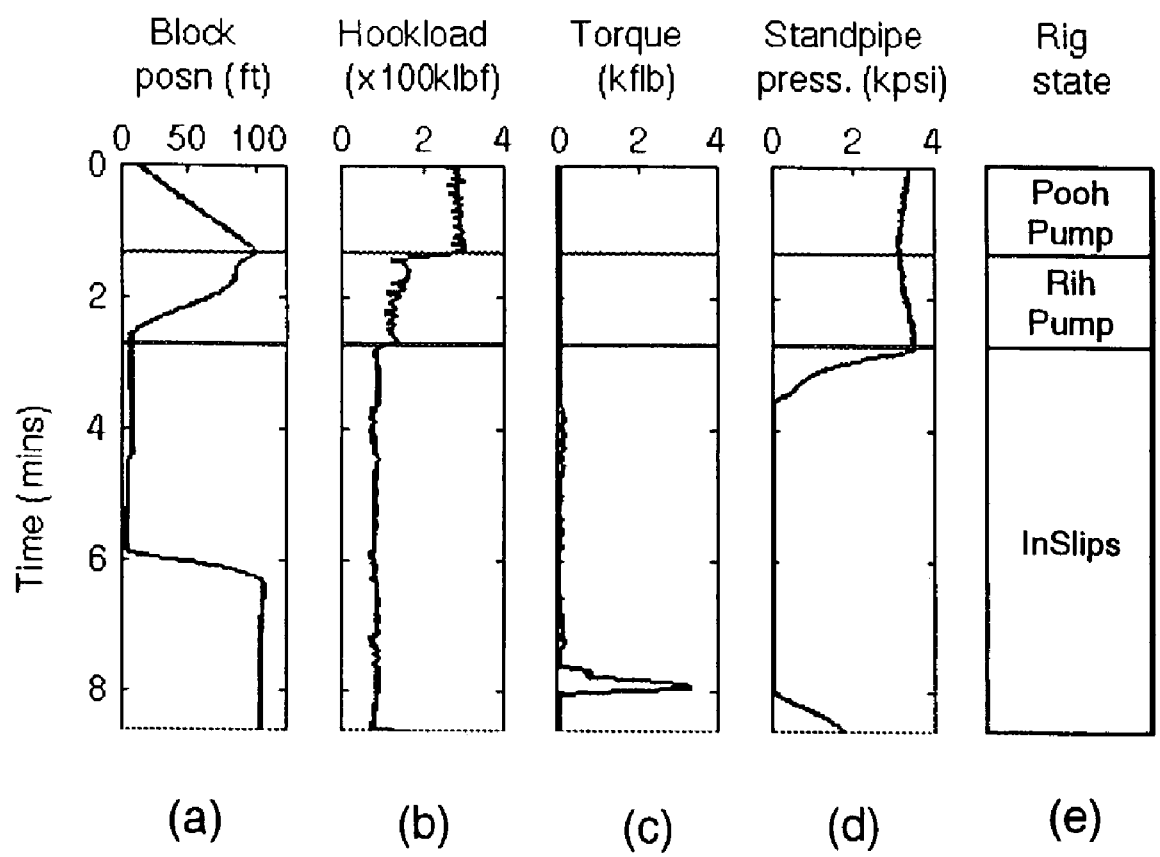
FIG. 1 shows an example of the inputs and output of a system for rig state detection, according to a preferred embodiment of the invention.

FIG. 1 shows an example of the inputs and output of a system for rig state detection, according to a preferred embodiment of the invention. Rig activity can be broken down into a number of processes, such as drilling in rotary mode, drilling in slide mode, RIH, POOH etc., that are controlled by the driller. As shown in the columns (a) to (d) in FIG. 1, the preferred input channels are measurements made at the surface on the rig, namely block position (a), Hookload (b), torque (c) and standpipe pressure (d). Based on these four input channels, the rig state detection system detects the state of the drilling rig, shown in column (e). In this example the system has detected states "PoohPump", "RihPump" and "in slips" which will be described in further detail below.

It has been found that the following 13 rig states provide a suitable basis for providing rig event detection and control in many applications:

| State | Rotation | Pumping | Block movement | Hookload |
|---|---|---|---|---|
| DrillRot | ✓ | ✓ | ↓ | Low |
| DrillSlide | x | ✓ | ↓ | Low |
| RihPumpRot | ✓ | ✓ | ↓ | Low |
| RihPump | x | ✓ | ↓ | Low |
| Rih | x | x | ↓ | Low |
| PoohPumpRot | ✓ | ✓ | ↑ | High |
| PoohPump | x | ✓ | ↑ | High |
| Pooh | x | x | ↑ | High |
| StaticPumpRot | ✓ | ✓ | x | ~T |
| StaticPump | x | ✓ | x | ~T |
| Static | x | x | x | ~T |
| In slips | x | Either | ↓ | ~B |
| Unclassified | Either | Either | Any | Any | where B = weight of the traveling block
T = weight of drill string

Preferably, a reasonable density is provided for each state-channel combination and a transition probability is assigned for each state-to-state transition. Unlikely transitions such as 'Pooh' then 'InSlips' are assigned a low probability, as the pipe must be moving downwards for the pipe to go into slips. Consequently, 'Rih' then 'InSlips' should receive a high probability.

An 'unclassified' state is included with extremely conservative densities to capture less likely operations, such as rotating but not pumping. However, according to the particular application at hand, it may be useful to define further states. For example, it has been found that in some cases three additional states are useful to define the case of rotating without pumping: RihRot, PoohRot, StaticRot.

Since the surface measured input channels are typically corrupted by noise, the system for detecting rig state makes use of Bayesian inference, in that it preferably operates by representing degrees of belief in opposing hypotheses. These hypotheses incorporate the extensive prior information that is known about each state (e.g. hookload drops to the weight of the travelling block whilst the pipe is in slips) and which state is likely or unlikely to follow another.

According to a preferred embodiment, the basic rig states feed into a hierarchy of more complex rig states. An 'in slips' state where the block position ends up approximately 90 ft higher than when it entered the state could be relabeled 'Connection (pipe added)'. The sequence 'Rih', 'Connection (pipe added)', 'Rih', 'Connection (pipe added)', etc. could be classified as 'Tripping in'.

Most of the known multiple changepoint problems in the general signal processing literature are applied to the data retrospectively, but the computation involved usually precludes their application to on-line detection. For example, U.S. Pat. No. 5,952,569, hereby incorporated herein by reference, discloses the application of single changepoint models that are computationally inexpensive by comparison, so this is both retrospective and on-line. Sequential methods modify the result from the previous time step, rather than recompute from scratch, so more sophisticated models can be applied within the sampling period. According to preferred embodiments of the invention the sequential Bayesian technique known as particle filtering is used in rig state detection using a parametric particle filter.

Sequential Bayesian Filtering will now be described in further detail. A noisy measurement $x_t$ is represented as a function of an underlying system variable $\theta_t$ and an observation noise term $v_t$ in the observation model $$x_t = h_t(\theta_t, v_t). \tag{1}$$

The system model $$\theta_{t+1} = f_t(\theta_t, w_t) \tag{2}$$

captures the dynamics of the system. The current value of the system variable, $\theta_{t+1}$, is assumed to be dependent on the previous value, $\theta_t$, but independent of the value at all other times, $\theta_{t-1}, \theta_{t-2}, \ldots, \theta_0$; such a process is called Markov.

Events that influence the system dynamics but are not captured by the Markov process are represented as another noise process called system noise $W_t$. As an example, $\theta_t$ is a vector containing the range and speed of an aircraft flying directly away from an airport. The system model $$\begin{pmatrix} r_{t+1} \\ \dot{r}_{t+1} \end{pmatrix} = \begin{pmatrix} 1 & \Delta t \\ 0 & 1 \end{pmatrix} \begin{pmatrix} r_t \\ \dot{r}_t \end{pmatrix} + \begin{pmatrix} 0 \\ w_t \end{pmatrix} \qquad (3)$$

models range as increasing by the product of speed and sampling time $\Delta t$. $w_t$ is a Gaussian that models changes in speed due to gusts of wind or the pilot changing thrust. $x_t$ is the range given by the airport's radar that is corrupted by Gaussian observation noise (combined effects of electrical noise in the amplifiers, finite range resolution of the radar, etc)

$$x_t = (1 \; 0)\begin{pmatrix} r_t \\ \dot{r}_t \end{pmatrix} + v_t. \qquad (4)$$

According to a preferred embodiment, the rig state detection system employs a specific type of particle filter called the parametric particle filter.

Parametric particle filter (PPF) as used herein describes a particle filter where the system model or the observation model is controlled by a hidden Markov model, as defined in Carpenter J, Clifford P and Fearnhead P, "Building Robust Simulation-based Filters for Evolving Data Sets", Technical report, Department of Statistics, University of Oxford, 1998.

A hidden Markov model (HMM) is a probabilistic process over a discrete set of states $\gamma = \{1, \ldots, K\}$. The likelihood of the state at the next time step is given by a square matrix of transition probabilities $P(\gamma_{t+1}|\gamma_t)$ that can capture likely and unlikely sequences of states.

Figure 2:
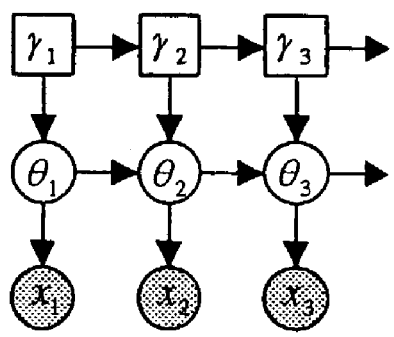
FIG. 2 illustrates a parametric particle filter viewed as a Bayesian network.

FIG. 2 illustrates a parametric particle filter viewed as a Bayesian network. In the Bayesian network representation of the parametric particle filter, the arrows indicate the direction of causal impact.

Each particle must consider the possibility of state transition at each step, so the particle is split into K new particles with weights $$\tilde{m}_{t+1}^{i,j} \propto m_t^i p(x_{t+1}|\gamma_{t+1}=j,\alpha_t^i) P(\gamma_{t+1}=j|\gamma_t^i). \qquad (5)$$

for $j=1, \ldots, K$. A resampling step is used to reduce to number of particles from nK back to n, to avoid an exponentially increasing number of particles with time. The resampling step and the Kalman filter are now discussed in further detail.

The minimum variance sampling algorithm chooses a new set of weights $X^{i,j}$ that minimises $$E\left(\sum_{j=1}^{K}\sum_{i=1}^{n}(\tilde{m}_{t+1}^{i,j} - X^{i,j})^2\right) \qquad (6)$$

subject to the constraints $E(X^{i,j})=\tilde{m}_{t+1}^{i,j}$ and that at most n of the $X^{i,j}$ are non-zero. The weights that will propagate to the next time step $(m_{t+1}^i)i=1, \ldots, n$ will consist of the non-zero $X^{i,j}$. The resulting algorithm is as follows:

1. Calculate c, the unique solution to $$n = \sum_{j=1}^{K}\sum_{i=1}^{n} \min(c\tilde{m}_{t+1}^{i,j}, 1).$$

This can be solved iteratively. See, "Sequential Monte Carlo methods in filter theory", P. Fearnhead, Department of Statistics, Oxford University, 1998 p.92.

2. Particles where $c\tilde{m}_{t+1}^{i,j}>1$ are retained with unchanged weights $X^{i,j}=\tilde{m}_{t+1}^{i,j}$. The number of retained particles is k.

3. n-k particles are sampled from the remaining nK-k particles using the systematic sampling algorithm (See, Carpenter, 1998, p.8). Note that the published algorithm contains a typographical error; the fourth line from the end should read 'switch $s^k$ with $s^{j}$'. The sampled particles receive weight $X^{i,j}=1/c$ and the remainder are set to zero.

4. Normalise $X^{i,j}$ to sum to unity

5. Set $(m_{t+1}^i)_i=1, \ldots, n$ to the non-zero $X^{i,j}$.

The likelihood of a particular state at any time can be estimated by the sum of the weights of the particles in that state (see, Fearnhead, 1998, p.88).

$$\hat{P}(\gamma_{t+1} = j | x_{1:t}) = \sum_{i=1}^{n} m_{t+1}^i \delta(\gamma_{t+1}^i - j). \qquad (7)$$

If the state of the system is unchanged, it is assumed that the following observation and system models apply, $$\theta_t = F\theta_{t-1} + W_t \qquad (8)$$

$$x_t = H\theta_t + V_t$$

The noise random variables $W_t$ and $V_t$ are multivariate Gaussian random variables with zero mean and covariance matrices Q and R. $W_t$ and $V_t$ are uncorrelated. If the prior is also Gaussian, at each time step, both the prior and posterior will be Gaussian. The solution to these conditions is the well-known Kalman filter.

The prior at time t, $p(\theta_t|x_{1:t-1})$, has mean $\alpha_{t|t}$ and covariance $P_{t|t-1}$.

The posterior at time t, $p(\theta_t|x_{1:t})$, has mean at $\alpha_t$ and covariance $P_t$.

The Kalman filter equations are:

$$\alpha_{t|t-1} = F\alpha_{t-1}, \qquad (9)$$

$$P_{t|t-1} = FP_{t-1}F^T + Q, \qquad (10)$$

$$\alpha_t = \alpha_{t|t-1} + P_{t|t-1}K_t^{-1}(x_t - \alpha_{t|t-1}), \qquad (11)$$

$$P_t = P_{t|t-1} - P_{t|t-1}K_t^{-1}P_{t|t-1}. \qquad (12)$$

K, the Kalman gain matrix, is given by $$K_t = P_{t|t-1} + R. \qquad (13)$$

Figure 3:
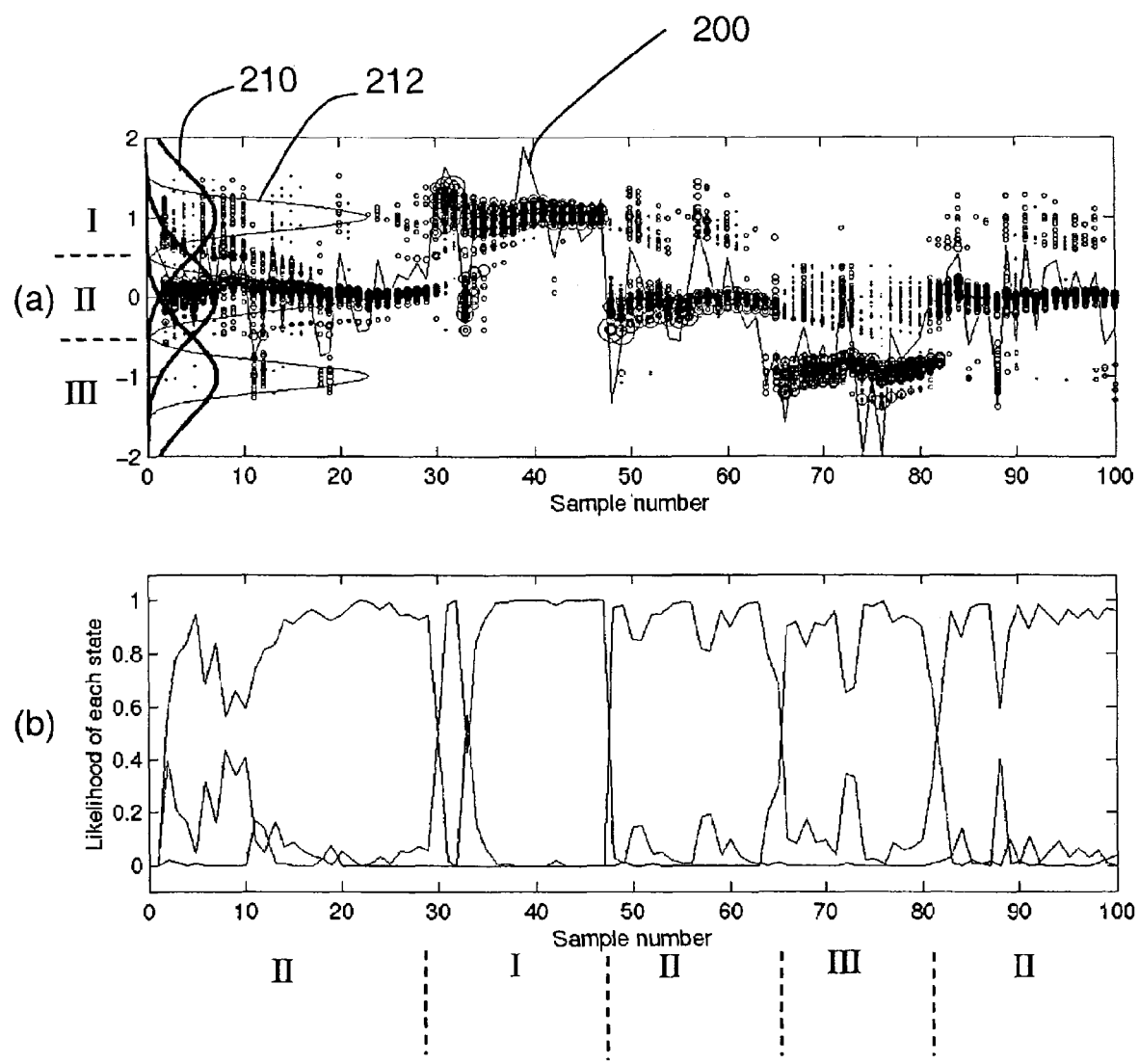
FIG. 3 shows simulated data where each sample was drawn from one of three noisy states.

A simple example of a parametric particle filter will now be described. FIG. 3 shows simulated data where each sample was drawn from one of three noisy states. In particular FIG. 3 shows an example of a parametric particle filter applied to simulated data drawn from the bold Gaussians 210 on the left side plot (a). The narrow Gaussians 212 indicate the prior knowledge of the state locations. In this example, there is a single input channel denoted by line 200, and the three state are denoted with roman numerals I, II, and III. The centre of each circle indicates a particle, its radius indicates the particle weight and the particle state is indicated by the roman numerals I, II and III. 100 particles were used.

In plot (b) a PPF was used to estimate which state the data was drawn from. The numerals I, II and III indicate the most likely state for each sample. Each particle contained an independent Kalman filter for each state. The filter corresponding to the particle's current state was updated sequentially, but the other two filters remained dormant.

Figure 4:
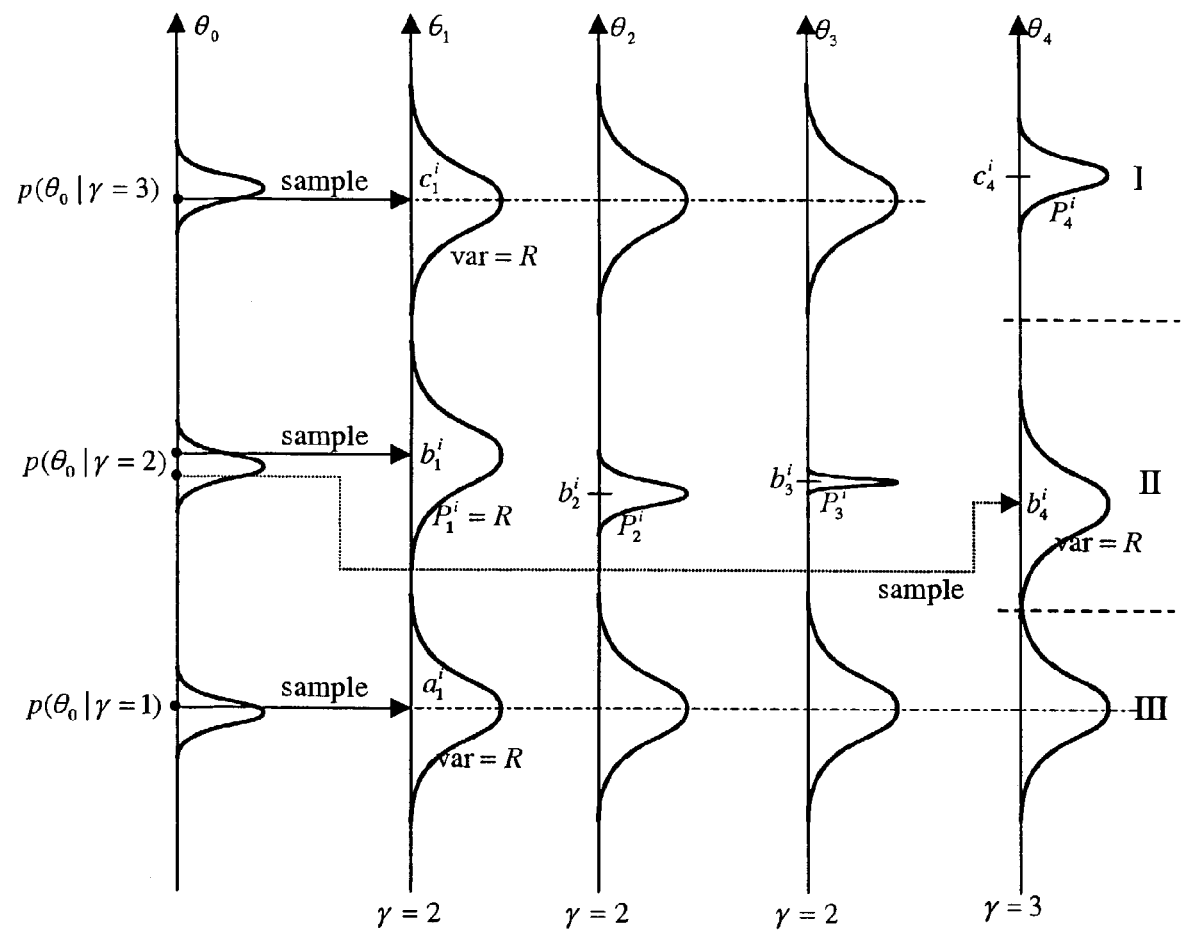
FIG. 4 shows changes in the posterior densities of one particle during four time steps from the example shown in FIG. 3.

FIG. 4 shows changes in the posterior densities of one particle during four time steps from the example shown in FIG. 3. The three states are indicated by the roman numerals I, II and III. Note that these graphs are all priors and posterior densities in the system variable domain. The likelihood densities in the observation variable domain would be wider, e.g. $p(\theta_3|\gamma=2)$ is almost a delta function, so the likelihood density would look very similar to $p(\theta_t|\gamma=2)$ as the variance=R.

When a particle changed state, its belief of the old state was reinitialised. When using PPFs for rig state detection systems, if it is known that the driller previously held the weight-on-bit near 10 klbf when drilling, it is risky to assume that the driller will do the same next time.

Each particle $s_t^i$ incorporated $\gamma_t^i$, the belief of the state of the HMM and $\alpha_t^i$, the particles' support points, $$s_t^i = (\gamma_t^i a_t^i b_t^i c_t^i P_t^i) \quad (14)$$

where $a_t^i$, $b_t^i$ and $c_t^i$ are the posterior means of the three states (i.e. equation (11) for each of the Kalman filters)
$P_t^i$ is the posterior variance of the active Kalman filter (both dormant filters had variance R, so it is inefficient to store this information in each particle)

The Kalman model was the same for each state F=H=1, Q=0, R=0.3, $P_1$=R. The choice of transition probabilities $$P(\gamma_{t+1} | \gamma_t) = \begin{pmatrix} 1 - P_J & P_J & 0 \\ P_J & 1 - 2P_J & P_J \\ 0 & P_J & 1 - P_J \end{pmatrix} \quad (15)$$

is fundamental to the filter behaviour in this example. Direct jumps between states 1 and 3 were not permitted, so the filter estimated that the likelihood of being in state 1 at t=48 was negligible, despite the observation being close the mean of state 1. It was assumed that the HMM would remain in a state length for approximately 20 samples, so the probability of jumping $P_J$ was set to 1/20=0.05. Increasing $P_J$ would increase the likelihood of mini-states existing at t=33, 72 and 88.

It would be relatively simple to define an observation model with $x_t$ as a vector of the four surface channels and form a corresponding system model, but as the dimensionality of the problem increases, the number of particles required increases exponentially. In problems where the useful information is easier to extract from some channels than others, modeling the simpler channels with a non-evolving likelihood reduces the dimensionality of the problem. The weight equation for the new particles then becomes $$\tilde{m}_{t+1}^{i,j} \propto m_t^i p(a_{t+1} | \gamma_{t+1} = j, \alpha_t^i) \frac{p(b_{t+1} | \gamma_{t+1} = j)}{p(b_t | \gamma_t^i)} P(\gamma_{t+1} = j | \gamma_t^i) \quad (16)$$

wher
$\tilde{m}_{t+1}^{i,j}$=weight of the jth descendent of ith
$m_t^i$=weight of ith particle=parent's
$a_t$=observations requiring an evolving
$b_t$=observations not requiring an
$\gamma_t$=hidden state=rig state
$\alpha_t^i$=vector of parameters that contain
$p(a_t| \ldots)$=Gaussian likelihood from the Kalman
$p(b_t| \ldots)$=non-evolving likelihood
$P(\gamma_t| \ldots)$=transition probability This approach is demonstrated in the following example of a rig state detection system using only HKLD and BPOS channels. The signal-to-noise ratio of the BPOS channel is usually very high, so this channel was modeled with a non-evolving likelihood, giving $$\tilde{m}_{t+1}^{i,j} \propto \quad (17)$$
$$m_t^i p(HKLD_{t+1} | \gamma_{t+1} = j, \alpha_t^i) \frac{p(BVEL_{t+1} | \gamma_{t+1} = j)}{p(BVEL_t | \gamma_t^i)} P(\gamma_{t+1} = j | \gamma_t^i).$$

The relevant priors for HKLD and likelihoods for BVEL are given in the following table (the TQA and SPPA likelihoods can be ignored until a later example).

| | | | | | |
|---|---|---|---|---|---|
| | | | Table of priors and likelihoods | | |
| State | Alternative name | HKLD | BVEL | TQA | SSPA |
| DrillRot | Rotary mode drilling | U(B, T + 2$\sigma_T$) | U(-V$_{DRILL}$, 2$\sigma_v$) | U($\mu_{TQ0}$ - 3$\sigma_{TQ0}$, TQ$_{DRILL}$) | ON |
| DrillSlide | Slide mode drilling | As above | As above | As StaticPump | ON |
| RihPumpRot | Reaming in | 0.8U(B, T + 2$\sigma_T$) + 0.2U(T + 2$\sigma_T$, T + O) | U(-V$_{TRIP}$, 0) | As DrillRot | ON |
| RihPump | Sliding in | As above | As above | As StaticPump | ON |
| Rih | Tripping in | As above | As above | As StaticPump | OFF |
| PoohPumpRot | Reaming out | 0.2U(B, T - 2$\sigma_T$) + 0.8U(T - 2$\sigma_T$, T + O) | U(0, V$_{TRIP}$) | As DrillRot | ON |
| PoohPump | Sliding out | As above | As above | As StaticPump | ON |
| Pooh | Tripping out | As above | As above | As StaticPump | OFF |
| StaticPumpRot | Circ. & rot. | N(T, $\sigma_T^2$) | N(0, $\sigma_v^2$) | As DrillRot | ON |

-continued

Table of priors and likelihoods

| | | | | | |
|---|---|---|---|---|---|
| StaticPump | Circulating | As above | As above | $N(\mu_{TQ0}, \sigma_{TQ0}^2)$ | ON |
| Static | Off bottom | As above | As above | As above | OFF |
| InSlips | | $N(B, \sigma_B^2)$ | $U(-V_{SLIPS}, 0)$ | As StaticPump | As below |
| Unclassified | | $U(B, T + O)$ | $U(-V_{TRIP}, V_{TRIP})$ | $U(2\mu_{TQ0}, TQ_{DRILL})$ | $U(0, C)$ |

| | SYMBOL | Description | Value | | Source |
|---|---|---|---|---|---|
| HKLD | T | THKD (total hookload) | 210 | klbf | Supplied by the acquisition system |
| | $\sigma_T$ | uncertainty in T | 5 | klbf | Estimated from StaticPumpRot states |
| | O | maximum overpull | 150 | klbf | Conservative estimate |
| | B | weight of travelling block | 85 | klbf | Estimated from InSlips states |
| | $\sigma_B$ | uncertainty in B | 10 | klbf | Estimated from InSlips states |
| BVEL | $V_{TRIP}$ | maximum tripping speed (up or down) | 3 | ft/s | Conservative estimate |
| | $V_{DRILL}$ | maximum ROP | 0.2 | ft/s | Conservative estimate |
| | $V_{SLIPS}$ | maximum speed of pipe hitting slips | 0.2 | ft/s | Conservative estimate |
| | $\sigma_V$ | uncertainty in BVEL | $10^{-3}$ | ft/s | Conservative estimate |
| TQA | $\mu_{TQ0}$ | zero calibration of TQA | -0.5 | kflb | Estimated from InSlips states |
| | $\sigma_{TQ0}$ | uncertainty in $\mu_{TQ0}$ | 10 | kflb | Estimated from InSlips states |
| | $TQ_{DRILL}$ | maximum torque whilst drilling | 260 | kflb | Estimated from DrillRot states |

Figure 12:
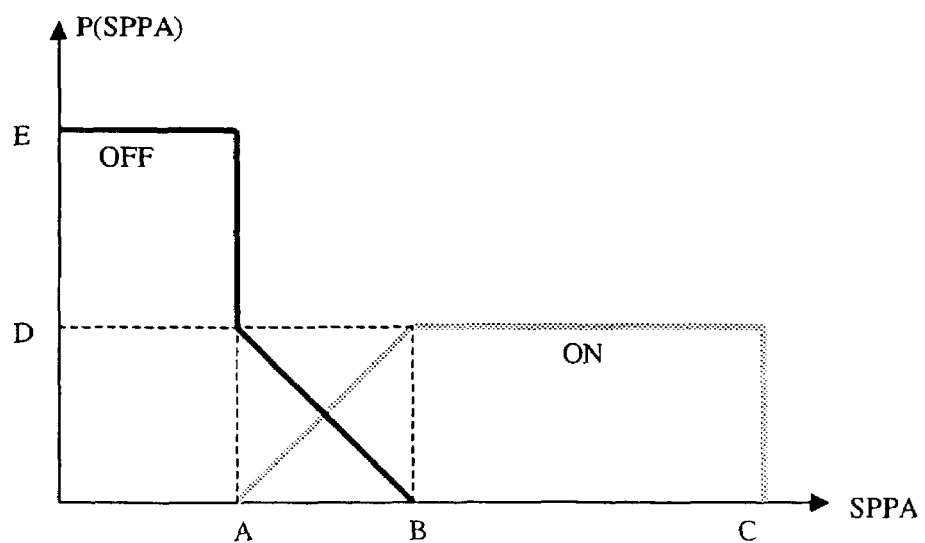
FIG. 12 illustrates piecewise linear standpipe pressure likelihoods for the cases of pumps on and pumps off, according to a described example.

Key:
U(low, high) = uniform pdf
N(mean, variance) = Gaussian pdf
Other symbols explained overleaf FIG. 12 illustrates the piecewise linear standpipe pressure likelihoods for the cases of pumps on and pumps off, according to this example. In FIG. 12, A=500 psi, B=1000 psi, C=5000 psi, D=2/(2C−B−A), E=(2C−2B)/(A(2C−B−A))

Conservative estimates are preferably be treated is constants. Parameters that are estimated from particular states will vary from rig to rig and many will vary with depth. These estimates can be made by personnel or by a calibration algorithm. The values in the above table were used for the examples shown.

"bit on bottom" and "in slips" indicators from systems such as IDEAL™ are useful for automatic calibration.

B and $\sigma_B$ are preferably set to the median and standard deviation of HKLD data when the "in slips" indicator is true.

$\mu_{TQO}$ is preferably set to the median of the TQA data when the "in slips" indicator is true. This automatically rejects make-up and break-out torques.

$TQ_{DRILL}$ is preferably set to the maximum value of TQA whilst the "bit on bottom" indicator is true.

Figure 5:
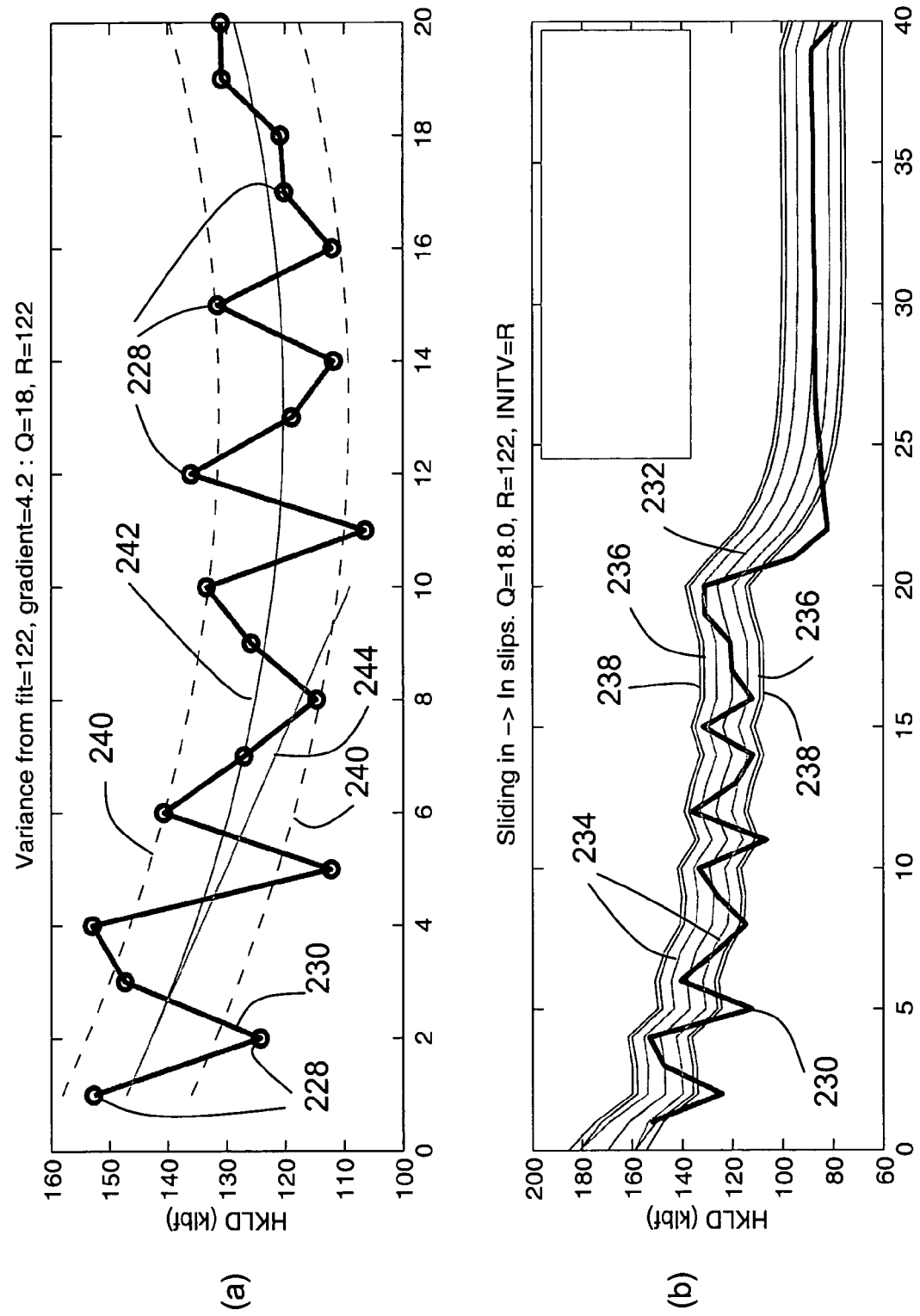
FIG. 5 shows an example of the parameters of the Kalman filter optimized for detecting the state "InSlips;"

Detecting when the drill string goes into slips is very important, so the Kalman filter is preferably optimised for this transition. FIG. 5 shows the parameters of the Kalman filter optimized for detecting the state "InSlips." Plot (a) shows hookload versus sample number for a limited number selected samples. The hookload data is shown by points 228 joined by thick line 230. A quadratic 242 is fitted to the hookload data as shown. Also shown by the dotted lines 240 is 3 standard deviations from the fitted quadratic. The observation noise variance R is estimated by fitting a quadratic 242 to the 'RihPump' HKLD data shown in FIG. 5(*a*). The maximum gradient of the quadratic fit was 4.2klbf/s, shown by line 244. It was assumed that the system noise process should be capable of generating a sample of this magnitude as a 1-sigma event, so Q was set at $4.2^2$=18.

In FIG. 5(*b*) also shows hookload data versus sample number, but for a wider range of samples. In this example, the hookload data line is again denoted with numeral 230. The Kalman estimate is shown by line 232, which is surrounded first by the standard deviation of the Kalman estimate 234, then by the standard deviation of the observation noise, R (shown by lines 236), and finnaly by the standard deviation of the Kalman error+R (shown by lines 238). As the Kalman filter cannot track the transition very quickly, the descendent of a 'RihPump' particle also in the 'RihPump' state will obtain a much lower weight than the descendent in the 'in slips' state sitting down at ~85 klbf.

The block will continue to drop a few inches after the pipe has gone into slips, so a change in BVEL will lag a change in HKLD and is therefore less useful for detecting in slips accurately. SPPA and TQA contain no information about the transition, so the processing of HKLD must be as accurate as possible.

Figure 6:
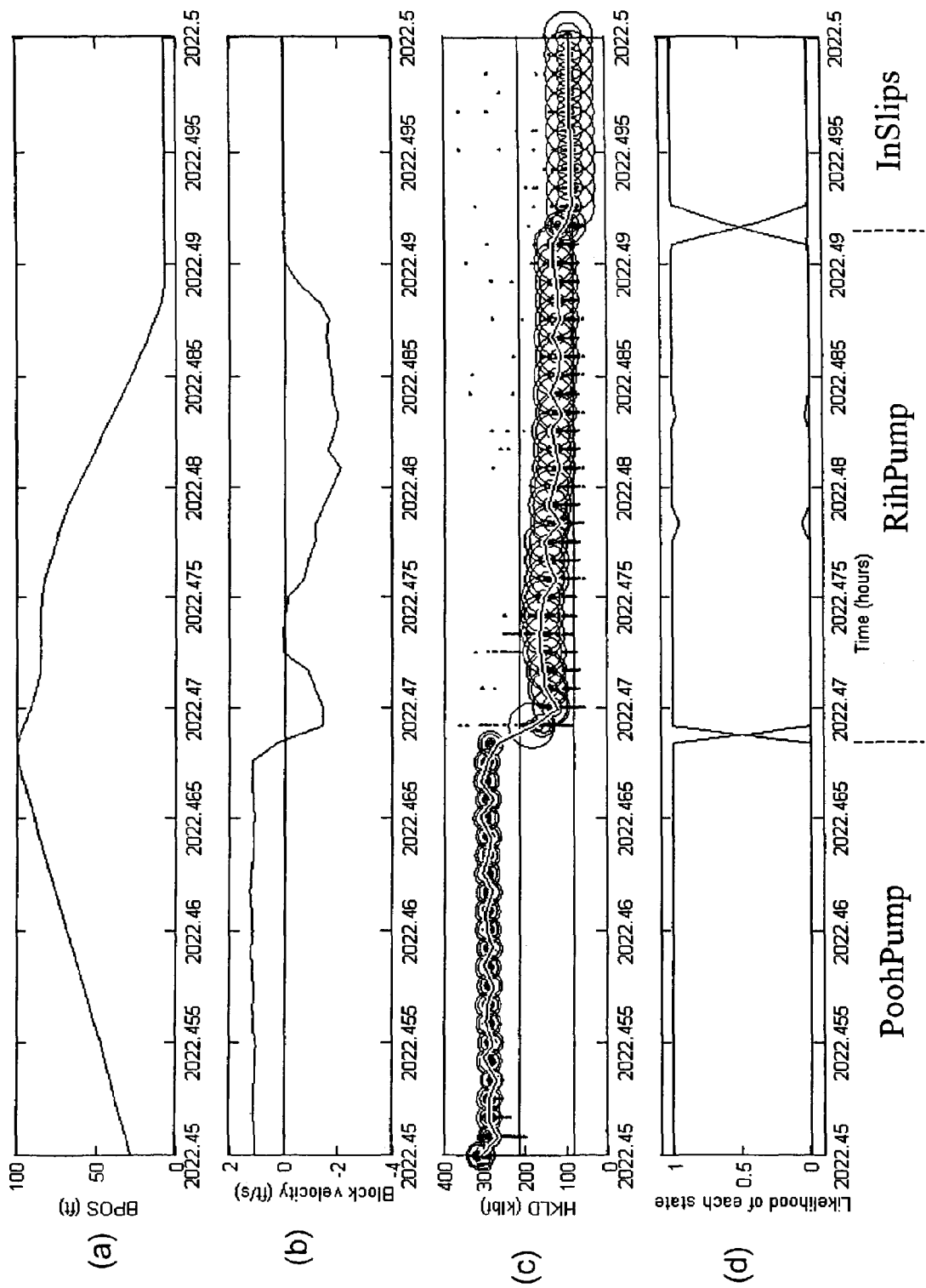
FIG. 6 shows a parametric particle filter detecting 'PoohPump', 'RihPump' and 'InSlips' states using HKLD and BPOS data, according to a preferred embodiment of the invention.

FIG. 6 shows the PPF detecting 'PoohPump', 'RihPump' and 'in slips' states using HKLD and BPOS data, according to a preferred embodiment of the invention. Plot (a) shows the block position and plot (b) shows block velocity, which is a function of block position. Plot (c) shows the hookload input channel. As used herein, input channels are "independent" when one input channels is not a direct function of the other input channel. Thus block position and block velocity are not independent from one another, but they are both independent of the hookload input channel.

As in FIG. 3(*a*), in plot(c) the centre of each circle indicates a particle and its radius indicates the particle weight. The overwhelming state of the particles is noted by the state names at the bottom of FIG. 6, namely "PoohPump", "RihPump" and "InSlips." In this exmple, 100 particles were used. Plot (d) shows detected state probabilities by summing particle weight at each sample number.

An example of a rig state detection system using four input channels will now be described. The installation of an RPM sensor is much more complex than a torque (TQA) sensor, so most oilfield drilling jobs rely on the latter only. Note that if it becomes practical to provide an RPM sensor on the rig, RPM would be much preferred over Torque as an input channel to the automatic rig state detecting system. For state detection, TQA is used to differentiate between rotating and non-rotating states that otherwise look very similar, e.g. 'RihPump' and 'RihPumpRot'. Any torque above a noise floor would count as rotating. The statistics of TQA in the non-rotating state should be approximately stationary, so an evolving likelihood is not necessary. The TQA likelihoods are shown in the likelihood table above.

Similarly, most of the information in SPPA is also binary—pumps on or off, for distinguishing 'RihPump' from 'Rih'. The weight of the new particles is therefore:

$$\tilde{m}_{t+1}^{i,j} \propto m_t^i P(HKLD_{t+1}|\gamma_{t+1}=j, \alpha_t^i) P(\gamma_{t+1}=j|\gamma_t^i) L_{t+1}^j / L_t^j \quad (18)$$

where $L_{t+1}^j = p(BVEL_{t+1}|\gamma_{t+1}=j) p(TQA_{t+1}|\gamma_{t+1}=j) p(SPPA_{t+1}|\gamma_{t+1}=j)$ is not particle dependent, so need only be calculated once per time step.

Figure 7:
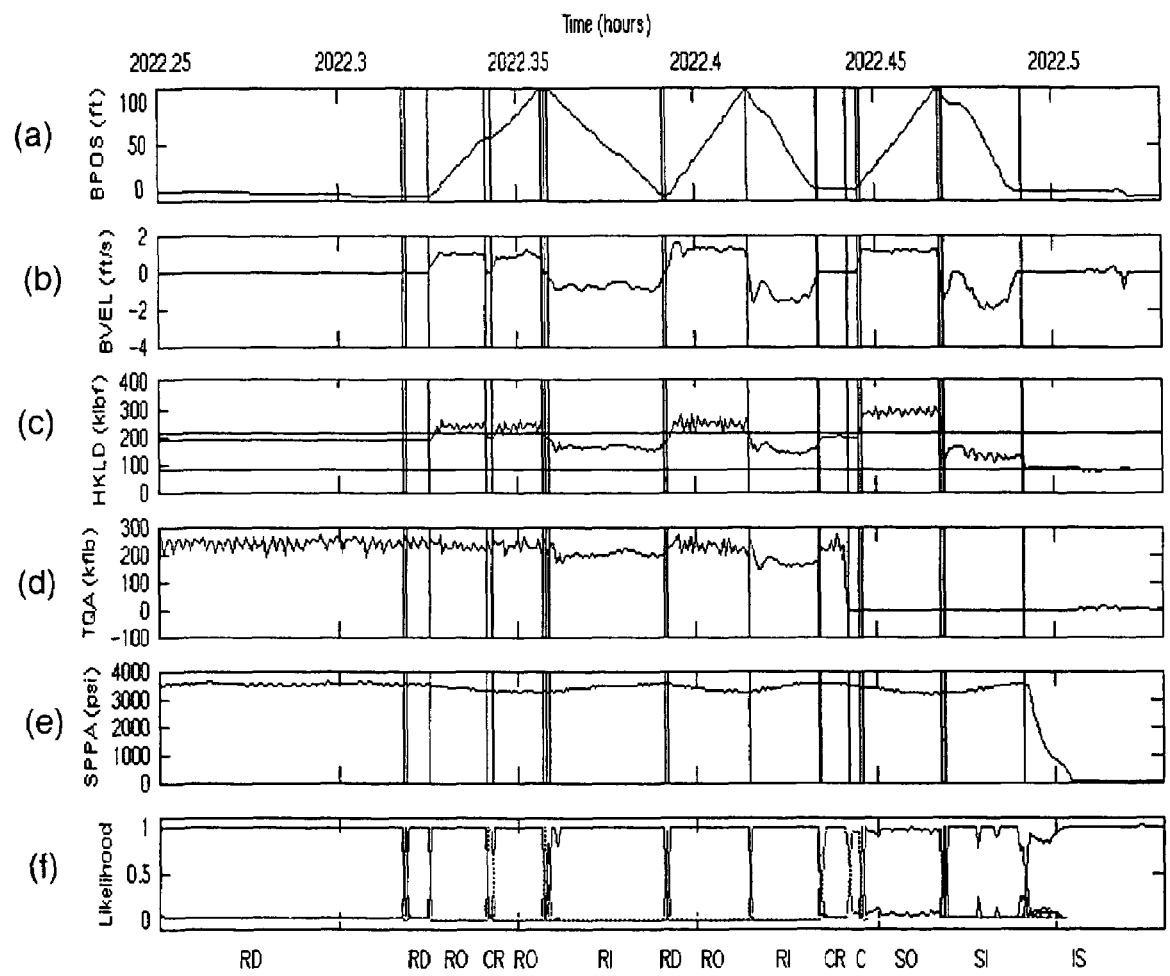
FIG. 7 shows plots of the inputs and output of a rig state detection system according to a preferred embodiment of the invention.

FIG. 7 shows plots of the inputs and output of a rig state detection system according to a preferred embodiment of the invention. In the case of FIG. 7, the same data was used as in the example of FIG. 6 but it includes a wider range of samples. In the case of FIG. 7 a preferred PPF based algorithm was applied to 16 minutes of drilling data. Rows a–e show block position, block velocity, Hookload, torque and standpipe pressure respectively. Row f shows the output of the rig state detection. The individual states are expressed in terms of a probability. Note that in FIG. 7, eight out of the proposed thirteen states have been implemented to date and are shown in plot (f) of FIG. 7. In plot (f), the two letter labels refer to the following rig states: RD=DrillRot, RO=PoohPumpRot, CR=StaticPumpRot, RI=RihPumpRot, C=StaticPump, SO=PoohPump, SI=RihPump, and IS=InSlips.

In the present example, the transition matrix P was assigned uniform values to simplify interpretation. Even more realistic values are preferred so as to improve the state detection. An example of an unlikely state sequence is drilling in rotary mode occurring directly after drilling in slide mode (DrillSlide). This is because drag forces are greater during slide mode drilling, so if rotation began whilst on bottom, the weight-on-bit could quickly become undesirably high. DrillSlide, PoohPump ~5 ft, RihPumpRot ~5 ft, DrillRot is a more typical sequence.

The first 12 states in the above table of priors and likelihoods deliberately leave gaps in the parameter space of the four surface channels, which correspond to very unlikely or potentially damaging operations, e.g. if the BHA contains a mud motor, RIH whilst rotating but not pumping is a very risky operation, as if the bit touched the borehole wall and rotated, it would suck mud and possibly cuttings into the motor. To cover these gaps and prevent instability in the software, a state called 'unclassified' with very broad priors is defined.

Figure 8:
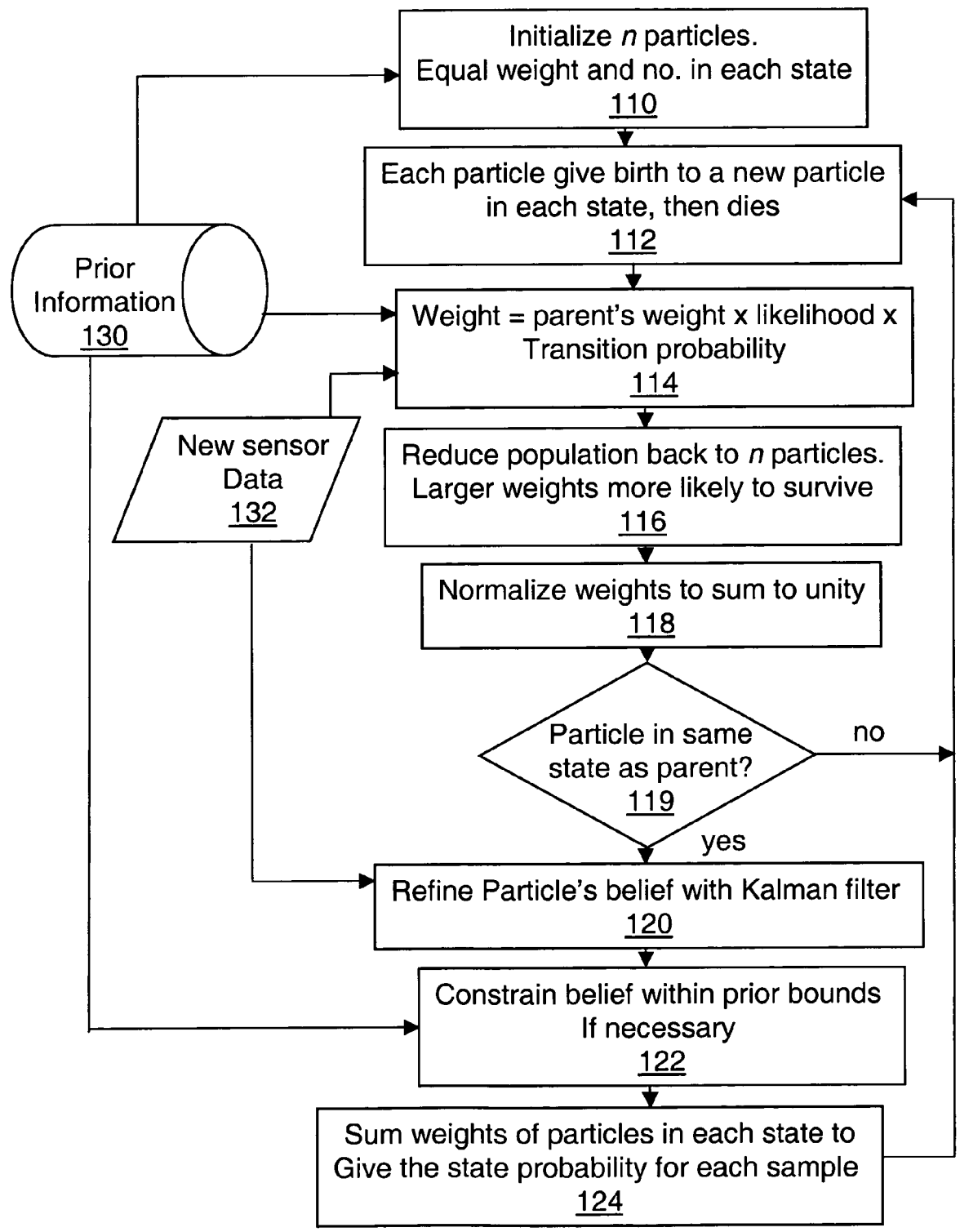
FIG. 8 shows steps involved in a system for automatic rig state detection based on a preferred embodiment of the invention.

FIG. 8 shows steps involved in a system for automatic rig state detection based on a preferred embodiment of the invention. In particular, FIG. 8 shows steps for using a parametric particle filtering method for automatic rig state detection. In step 110, n particles are initialized with equal weight and equal number of particles in each state. The particles are preferably randomly sampled from likelihood distributions which form part of prior information 130. For examples of suitable likelihood distributions see "Table of all priors and likelihoods" above. Note that the likelihood distributions form $\alpha_t^i$ in equation (16). In step 112, each particle give "birth" to a new particle in each state, and then "dies." In step 114, the weight is calculated as the parent's weight time the likelihood times the transition probability. The likelihood distributions from prior information 130 and the new sensor data 132 (i.e. input channels) are preferably incorporated according to equation (16). In steps 116 and 118, the population is reduced back to n particles, with the larger weights more likely to survive, and the weights are normalized to sum to unity. The preferred method for carrying out these steps is described above in the description following equation (6). In step 119, the state of the particle is compared with that of its parent. If they are not the same, step 112 should be repeated for the next sample. If they are not the same the particle's belief is preferably refined using the Kalman filter using data 132 according to equations (9) to (13) above. In step 122, the beliefs are constrained within prior bounds if necessary, preferably using likelihood models in prior information 130, such as from the table above. In step 124, the weights of the particles are summed in each state, thereby yielding the state probability for each sample, and then step 112 is repeated for the next sample.

According to the invention, when the drilling conditions have made the occurrence of a particular drilling event quite likely, it may be known a priori that changing to a particular rig state could greatly exacerbate the problem. For example, on the verge of a pack-off event, the driller should not pull-out-of-hole until the borehole has been circulated sufficiently thoroughly for the probability of pack-off to fall to a reasonable level. A prediction of the next rig state can be derived from the current state probabilities and the transition probabilities, $$P(\gamma_{t+1} = k \mid data_{1:t}) = \sum_{\gamma_t} P(\gamma_{t+1} = k \mid \gamma_t) P(\gamma_t \mid data_{1:t}) \quad (19)$$

If the event probability is high and the probability of an undesirable next rig state is high, the algorithm preferably reminds the driller not to change into that particular rig state. The same technique is preferably applied recursively to predict the rig state a number of samples ahead.

According to an alternative embodiment, additional input channels are used and the rig state is accurately detected without the use of particle filtering techniques. In this example, the rig state detection system makes use of two input channels from a known drilling acquisition system, known as IDEAL™ from Schlumberger. Specifically two binary indicators are used: (1) BONB which indicates when the bit is on bottom, and (2) STIS which indicates when the pipe is in slips.

Bayes' rule gives, $$P(\gamma_t = j \mid b_t) = \frac{p(b_t \mid \gamma_t = j) P(\gamma_t = j)}{\sum_{\gamma_t} p(b_t \mid \gamma_t) P(\gamma_t)} \quad (20)$$

where
  $P(\gamma_t=j|b_t)$=posterior probability of state j
  $p(b_t|\gamma_t=j)$=multivariate likelihood of state j
  $P(\gamma_t=j)$=prior probability of state j
  Modeling the likelihoods independently gives, $$P(b_t|\gamma_t=j) = p(HKLD_t|\gamma_t=j) p(BVEL_t|\gamma_t=j) p(SPPA_t|\gamma_t=j) \times p(TQA_t|\gamma_t=j) P(BONB_t|\gamma_t=j) P(STIS_t|\gamma_t=j) \quad (21)$$

Extending the likelihood table to include the binary indicators give the following table.

| State | Rotation | Pumping | Block movement | Hookload | BONB | STIS |
|---|---|---|---|---|---|---|
| DrillRot | ✓ | ✓ | ↓ | Low | 1 | 0 |
| DrillSlide | x | ✓ | ↓ | Low | 1 | 0 |
| RihPumpRot | ✓ | ✓ | ↓ | Low | 0 | 0 |
| RihPump | x | ✓ | ↓ | Low | 0 | 0 |
| Rih | x | x | ↓ | Low | 0 | 0 |
| PoohPumpRot | ✓ | ✓ | ↑ | High | 0 | 0 |
| PoohPump | x | ✓ | ↑ | High | 0 | 0 |
| Pooh | x | x | ↑ | High | 0 | 0 |
| StaticPumpRot | ✓ | ✓ | x | ~T | 0 | 0 |
| StaticPump | x | ✓ | x | ~T | 0 | 0 |
| Static | x | x | x | ~T | 0 | 0 |
| InSlips | x | Either | ↓ | ~B | 0 | 1 |
| Unclassified | Either | Either | Any | Any | Either | Either |

According to another alternative embodiment, fuzzy logic is used to automatically detect rig states instead of or in combination with the probabilistic methods described above.

According to an alternative embodiment, an independent particle filter is applied to each input channel to detect temporal features in the data, such as step-changes, ramps etc; these filters are called "changepoint detectors". A further particle filter analyses the estimated distribution of changepoints and segment parameters, in addition to the raw channel data, to determine the probability of each rig state.

The changepoint detectors are designed to segment a signal into sections each of which can be described by the following General Linear Model, $$y(m:t) = G_j(1:t-m+1)b + w,$$

where
- m is the changepoint time at the start of this segment (thus t+1 is the changepoint time of the next segment).
- y(m:t) are the data from time m to t arranged in a column vector.
- b is a column vector of coefficients (The algorithm does not need to know the value of b).
- $G_i$ is a matrix for the ith model and $G_j(1:t-m+1)$ indicates the first t-m+1 rows of the matrix. For example, $G_1$ below is a model for data with a constant mean and b will have one element which is the value of this mean; $G_2$ is a model for linearly varying data and b will have two elements being the intercept and slope of the line; $G_3$ is a model for an exponential decay with rate A and b will have two elements being the final value of the decay, and the amplitude of the exponential.

$$G_1(1:t) = \begin{bmatrix} 1 \\ 1 \\ 1 \\ \vdots \\ 1 \\ 1 \end{bmatrix}, \quad G_2(1:t) = \begin{bmatrix} 1 & 0 \\ 1 & 1 \\ 1 & 2 \\ \vdots & \vdots \\ 1 & t-2 \\ 1 & t-1 \end{bmatrix}, \quad G_3(1:t) = \begin{bmatrix} 1 & 1 \\ 1 & e^{-\lambda} \\ 1 & e^{-2\lambda} \\ \vdots & \vdots \\ 1 & e^{-(t-2)\lambda} \\ 1 & e^{-(t-1)\lambda} \end{bmatrix}$$

In the following $G_j(k)$ will indicate the kth row of the matrix. The total number of models is J, and $G_1$, $G_2$, ..., $G_J$ are to be specified by the user. Other data models that fit into this framework are polynomials of any order, sinusoidal models with known frequencies and autoregressive models. It is assumed that an arbitrary number of rows of $G_j$ can be specified; for the examples above it is obvious how to do this.

w is a column vector the same size as y(m:t), each element is an independent sample from a zero mean Gaussian with variance $\sigma^2$. As with b the algorithm does not need to know the value of $\sigma$.

To obtain data with changepoints, the values of b and a will be different in each segment. The desired output of the algorithm is a collection of lists of changepoint times, and a probability for each list. The most probable list is thus the most probable segmentation of the data according to the choice of models, $G_1, \ldots, G_j$.

The segmentation of the signal is best described using a tree structure, and the algorithm can be considered as a search of this tree. At time 0 (before any data has arrived) the tree consists of a single root node, R. At time 1 the root node splits into J leaves, one leaf for each of the J segment models—the first leaf represents the hypothesis that the first data point is modeled with $G_1$, the second leaf hypothesises $G_2$ etc. At subsequent times the tree grows by each leaf node splitting into J+1 leaves, one for each model and an extra one represented by 0 which indicates that the data point at the corresponding time belongs to the same model segment as its parent. For example, with the two models already described a path through the tree from the root to a leaf node at time 10 might be R1000002000, and this would indicate that y(1:6) was generated with $G_1$ and that y(7:10) was generated with $G_2$ (constant level followed by a ramp for the examples of $G_1$ and $G_2$ given earlier).

Some terminology will be useful. Considering a generic leaf node,
- "The current model" can be found by moving up the tree towards the root until a non-0 node is encountered—the current model is the value of this node.
- "The most recent changepoint" is the time corresponding to the node in the previous bullet point.

Over time the tree grows, and it is searched using a collection of particles each occupying a distinct leaf node. Let the particles be indexed by i=1,2, ..., N, (N is chosen by the user, and around 20–100 is usually sufficient) then associated with particle i is a weight, $w_i$, which can be interpreted as the probability that the segmentation indicated by the path from the particle to the root (as in the example above) is the correct segmentation. Reference will also be made to the term "node weight", which is the weight a particle located at some node would have (though there may not actually be a particle at the node). In order to define the algorithm, the method of updating the collection of N particles when a new data point arrives is first described, and second how to initialize the particles at the start.

At time t the whole tree will have $J(J+1)^{t-1}$ leaves, and it is assumed that $N<J(J+1)^{t-1}$ so that not all the leaves are occupied by a particle. (The case when $N \geq J(J+1)^{t-1}$ is the initialization process, described below.) The objective of the algorithm is to concentrate the particles on leaves that mean the particle weights will be large. To update the particles from time t−1 to time t Each particle is linked to its J+1 leaf nodes at time t. For the N particles collectively there will be (J+1)N such nodes—new particles are placed at each of these nodes. In the example, a particle whose path back to the root node is R1000002000 would spawn 3 new particles whose paths back to the root node would be

R1000002000
R1000002001
R1000002002

The new particles are referred to as "children" and the old particles "parents".

The weights for the child particles are calculated as the product of three terms; $w_{child} = w q_{parent} \times w_{prior} \times w_{likelihood}$, these are described below.

1. $w_{parent}$ is the weight of the parent particle.
2. $w_{prior}$ is a term which depends on the value of the child node and a user defined number $P_p$, which is between 0 and 1; if the child node is 0 then $w_{prior}=1-P_p$, otherwise, $w_{prior}=P_p/J$. Mathematically, this is the prior probability of a changepoint at any time, so that small $P_p$ encourage long segments. (Note, more complicated specifications of this are possible, such as dividing $P_p$ unequally among the J models when the child node is not 0, implying that some models are more probable than others. Also, a specification that precludes segments less than some value $T_{min}$; for a given node, if the most recent changepoint is less than $T_{min}$ away, the node has $w_{prior}=1$ if the node value is 0 and $w_{prior}=0$ otherwise. If the most recent changepoint is more than $T_{min}$ away, the simple model in the main text is used.)
3. $w_{likelihood}$ is a term which depends on the data, the current model, the most recent changepoint time and three user defined variables; $\alpha$, $\beta$ and $\delta$ that are all positive scalars. They are determined by trial and error, but suitable starting values are $\alpha,\beta=0.1$ and $\delta=50$. Increasing $\delta$ encourages fewer changepoints. For the child particle in question at time t, let the current model be i, the most recent changepoint be m, then $w_{likelihood}$ is given by:

$$w_{likelihood} = K\left[1 + \frac{(y(t)-\hat{y})^2}{\rho^2}\right]^{-(t-m+1)/2-\alpha}.$$

$$\text{where } \hat{y} = \frac{G_j(t-m)HG_j^T(1:t-m)y(m:t-1)}{1-G_j(t-m)HG_j^T(t-m)},$$

$$\rho^2 = \frac{2\beta + y(m:t-1)^T[1-G_j(1:t-m)HG_j^T(1:t-m)]y(m:t-1)}{1-G_j(t-m)HG_j^T(t-m)},$$

$$K = \frac{\Gamma((t-m+1)/2+\alpha)}{\sqrt{\pi\rho^2}\,\Gamma((t-m)/2+\alpha)},$$

$H=(G_j^T(1:t-m)G_j(1:t-m)+\delta^{-2}I)^{-1}.$ $\Gamma(.)$ is the gamma function, I is a suitably dimensioned identity matrix and $^T$ denotes a matrix transpose. (This computation results from the data model y(m:t)=$G_j$b+w, which defines a data likelihood $p(y(m:t)|b,\sigma,G_j)=N(y(m:t)|G_j b,\sigma^2 I)$, and a prior distribution for b and $\sigma$, $p(b,\sigma)=N(b|0,\sigma^2\delta^2 I)\times IG(\sigma^2|\alpha,\beta)$. From these $p(y(m:t)|G_j)$ can be computed by integrating $p(y(m:t)|b,\sigma,G_j)\times p(b,\sigma)$ over b and $\sigma$. $w_{likelihood}$ is actually $p(y(t)|y(m:t-1),G_j)$ which can be found from $p(y(m:t)|G_j)$ by standard probabilistic manipulations, and results in the expression for $w_{likelihood}$ given above.)

The child particle weights are normalized by calculating their sum, and replacing each child weight with its existing value divided by the sum.

From the N(J+1) children, N particles are selected to become parents at the next time step. This is done either by using the resampling method given in the PPF embodiment of the rig state detector using the particle weights as usual, or simply by selecting the N particles with largest weights. In the latter case, the surviving particles have their weights re-normalized as in the previous bullet point.

The initialization procedure will now be described. At time 1 the tree only has J leaf nodes, so J particles are initialized, one for each leaf; their weights are set to 1/J. To go from t=1 to 2 the usual update steps (as above) are applied to the J particles, so there are now J(J+1) children. If J(J+1)<N the final selection step (last bullet point above) is omitted. This is continued until the number of children exceeds N, when the selection step is re-introduced at every time step.

Two specific embodiments of this algorithm for the rig state detection problem are as follows.

The TQA data can be modeled with segments of constant mean, thus the changepoint algorithm is used with $G_1$ given in the above. Suitable values for the user-defined variables are $\alpha=0.1$ $\beta=0.1$, $\delta=100$ and $P_p=0.1$.

The BPOS data consists of flat and ramped segments with a small amount of noise, so the changepoint detector is used with $G_1$ (data with constant mean) and $G_2$ (linearly varying data) given earlier. Suitable user-defined variables are $\alpha=3$ $\beta=0.4$ and $\delta=1000$. The specification for $w_{prior}$ is different from that given above to take account of the fact that two $G_1$ segments cannot be adjacent (since the true block position must be continuous with respect to time). Considering a child particle at time t, let M be the model indicated by the particle for time t−1 (M=1 implies $G_1$, M=2 implies $G_2$) and n be the value of the node at time t, then $w_{prior}$ is defined according to the following table.

|   |   | n |   |   |
|---|---|---|---|---|
|   |   | 0 | 1 | 2 |
| M | 1 | $1-P_p$ | 0 | $P_p$ |
|   | 2 | $1-P_p$ | $P_p/2$ | $P_p/2$ |

For this example $P_p=0.05$ is suitable.

The rig state detector preferably uses the results of the changepoint detectors as its inputs, but some further processing is required to get them into a suitable format. Typical examples of this for the two channels considered above will be given.

The TQA channel can be used to infer if the drill string is rotating (ROT) or not ($\overline{ROT}$) and the probability of these two events is a sufficient synopsis of the information supplied by the TQA channel. This inference is performed via the mean level of the TQA channel (the parameter b for the current segment in the changepoint detector) as follows. If the rotation mode is ROT then the mean level is modeled with $p(b|ROT)=N(\mu_{TQ0}, \sigma_{TQ0}^2)$, and if the rotation mode is $\overline{ROT}$ the mean level is modeled with $p(b|\overline{ROT})=U(\mu_{TQ0}-3\sigma_{TQ0}, TQ_{DRILL})$ (Suitable values for $\mu_{TQ0}$, $\sigma_{TQ0}$, $TQ_{DRILL}$ can be found using the same procedure as in the PPF embodiment c.f. "Table of priors and likelihoods"). Assuming that $P(\overline{ROT})=P(ROT)=\frac{1}{2}$, the mean level models can be combined (using Bayes' Theorem) to give $$P(ROT|b) = \frac{p(b|ROT)}{p(b|ROT) + P(b|\overline{ROT})}$$

$$P(\overline{ROT}|b) = \frac{p(b|\overline{ROT})}{p(b|ROT) + P(b|\overline{ROT})}$$

These can be used with the output of the TQA changepoint detector to estimate $P(ROT|y(1:t))$ and $P(\overline{ROT}|y(1:t))$ as follows.

Set $P_{ROT}(t)=0$, select $N_s$ (This variable must be determined by experimentation, $N_s=100$ is a good default choice. The following routine calculates an approximation of $P(ROT|y(1:t))$ and increasing $N_s$ increases the accuracy of the approximation) then for $n_s=1, \ldots, N_s$, Using the systematic sampling algorithm (See Carpenter, 1998, p.8) sample once from the TQA particle weights, and set i equal to the index sampled by the algorithm.

Find $m_i$, the most recent changepoint time for TQA particle i.

Compute the following terms, where $g_1=G_1(1:t-m_i+1)$ $$\hat{b}=(g_1^T g_1+\delta^{-2}I)^{-1}g_1^T y(m_i:t),$$

$$\hat{\sigma}=[(g_1^T g_1+\delta^{-2}I)(2\beta+y(m_i:t)^T[I-g_1(g_1^T g_1+\delta^{-2}I)^{-1}g_1^T]y(m_i:t))]^{1/2},$$

$v = 2\alpha+t-m_i+1$.

Generate a sample from a Student-t distribution with v degrees of freedom using the algorithm in ('Statistical Computing', W. J. Kennedy & J. E. Gentle, Marcel Dekker, New York, 1980, p.219–220) and store the sample in x.

Set $\hat{b}=\hat{b}+x\hat{\sigma}$.

Increment $P_{ROT}(t)$ using $P_{ROT}(t) \leftarrow P_{ROT}(t) + w_i \times P(ROT|\hat{b})$, where $w_i$ is the weight of particle i.

At the end of this process $P_{ROT}(t)$ is the probability (indicated by the data y(1:t)) that the drill string is rotating and $P_{\overline{ROT}}(t)=1-P_{ROT}(t)$ is the probability that the drill string is stationary.

The synopsis from the BPOS channel is slightly different. Sufficient information from this channel is if the block is stationary, moving up, or moving down. The event STAT (block is stationary) is equivalent to the current segment model being $G_1$, UP is indicated by the current segment model being $G_2$ and the slope parameter (b(2) in this case) being positive, DOWN is indicated by the current segment model being $G_2$ and the slope parameter being negative. The probabilities of these events at time t (indicated by the data) are written $P_{STATIC}(t)$, $P_{UP}(t)$ and $P_{DOWN}(t)$ and are computed as follows. Initialise $P_{DOWN}(t)=0$ and $P_{STAT}(t)=0$, then or $i=1, \ldots, N$:

Find the most recent changepoint time, $m_i$ and the current model $M_i$.

If $M_i=1$
Increment $P_{STAT}(t)$ using $P_{STAT} \leftarrow P_{STAT}(t)+w_i$ where $w_i$ is the current particle weight.

If $M_i=2$
Compute the following terms, where $g_2 = G_2(1:t-m_i+1)$ $\hat{b}=(g_2^T g_2+\delta^{-2}I)^{-1}g_2^T y(m_i:t),$ $\hat{\Sigma}=(g_2^T g_2+\delta^{-2}I)(2\beta+y(m_i:t)^T[I-g_2(g_2^T g_2+\delta^{-2}I)^{-1}g_2^T]y(m_i:t)),$ $v=2\alpha+t-m_i+1.$ (Note that $\hat{b}$ is a 2-vector and $\hat{\Sigma}$ is a 2×2 matrix.).
Increment $P_{DOWN}(t)$ using $P_{DOWN}(t) \leftarrow P_{DOWN}(t)+w_i \, stcdf(v,-\hat{b}(2)/\sqrt{\hat{\Sigma}(2,2)}).$ At the end of this process $P_{UP}(t)$ is computed using $P_{UP}(t)=1-P_{DOWN}(t)-P_{STAT}(t)$.

Similar computations can be performed to deduce equivalent synopses for the other channels.

An example of a reduced model for rig state detection using the two changepoint embodiments given above as inputs will now be described. Let $\gamma_t$ be a random variable for the rig state at time t taking one of the following values: {PoohPumpRot, PoohPump, RihPumpRot, RihPump, StaticPumpRot, StaticPump}

These six states can be classified using the synopses from the TQA and BPOS channels and the following table.

| Rig State | Rotation | Block movement |
|---|---|---|
| PoohPumpRot | ROT | UP |
| PoohPump | $\overline{ROT}$ | UP |
| RihPumpRot | ROT | DOWN |
| RihPump | $\overline{ROT}$ | DOWN |
| StaticPumpRot | ROT | STAT |
| StaticPump | $\overline{ROT}$ | STAT |

The objective of the rig state detection algorithm is to compute the probability of each $\gamma_t$ using $P_{ROT}(1:t)$, $P_{\overline{ROT}}(1:t)$, $P_{DOWN}(1:t)$ $P_{STAT}(1:t)$ and $P_{UP}(1:t)$ and update these probabilities as t increases.

The user must specify a probability for all possible state transitions e.g. $Pr(\gamma_t=PoohPump|\gamma_{t-1}=StaticPump)$ and these may be encapsulated in a matrix $\Pi$ such that $\Pi_{ij}=Pr(\gamma_t=j|\gamma_{t-1}=i)$ with i and j varying over the six possible states. This matrix must satisfy $\Pi_{ij} \geq 0$ for all i,j and $\Sigma_j \Pi_{ij}=1$ for all i so that each row is a proper probability distribution. For the example embodiment the following simple specification is sufficient; $\Pi_{ij}=\epsilon$ for $i \neq j$ and $\Pi_{ij}=1-5\epsilon$ for $i=j$. $\epsilon=0.05$ is a suitable value and decreasing $\epsilon$ tends to encourage fewer state changes. More complicated specifications are possible that account for certain state transitions being more probable than others.

The information contained in the changepoint detector outputs are incorporated as follows. Let $P_{TQA}(t)=[P_{ROT}(t) P_{\overline{ROT}}(t)]$ and $P_{BPOS}(t)=[P_{DOWN}(t) \, P_{STAT}(t) \, P_{UP}(t)]$ be the outputs from the TQA and BPOS channels collected into two vectors. The user must specify twelve likelihood functions of the form $p(P_{TQA}(t)|\gamma_l)$ and $p(P_{BPOS}(t)|\gamma_l)$ for all six possible $\gamma_l$. Since $P_{TQA}(t)$ and $P_{BPOS}(t)$ are both vectors constrained so that their elements sum to 1, these likelihoods must be defined over similar spaces. The Dirichlet class of distributions has this property so they are used in this example. The Dirichlet distribution with k variables has the form $$p(\theta_1, \theta_2, \ldots, \theta_k) = \frac{\Gamma(\alpha_1 + \ldots + \alpha_k)}{\Gamma(\alpha_1) \times \cdots \times \Gamma(\alpha_k)} \theta_1^{\alpha_1-1} \times \cdots \times \theta_k^{\alpha_k-1}$$

for $\theta_1, \ldots, \theta_k \geq 0$ and $$\sum_{j=1}^{k} \theta_j = 1,$$

and the parameters $\alpha_j > 0$.

The explicit specification of these likelihoods for the model example is as follows.

$p(P_{TQA}(t)|\gamma_t))$
  For $\gamma_t \in$ {PoohPumpRot,RihPumpRot, StaticPumpRot} the likelihood is a 2-element Dirichlet with parameters $\alpha_1 = 3$ and $\alpha_2 = 1$.
  For $\gamma_t \in$ {PoohPump,RihPump,StaticPump} the likelihood is a 2-element Dirichlet with parameters $\alpha_1 = 1$ and $\alpha_2 = 3$.
$p(P_{BPOS}(t)|\gamma_t)$
  For $\gamma_t \in$ {RihPumpRot,RihPump} the likelihood is a 3-element Dirichlet with parameters $\alpha_1 = 3$, $\alpha_2 = 1$ and $\alpha_3 = 1$.
  For $\gamma_t \in$ {StaticPumpRot,StaticPump} the likelihood is a 3-element Dirichlet with parameters $\alpha_1 = 1$, $\alpha_2 = 3$ and $\alpha_3 = 1$.
  For $\gamma_t \in$ {PoohPumpRot,PoohPump} the likelihood is a 3-element Dirichlet with parameters $\alpha_1 = 1$, $\alpha_2 = 1$ and $\alpha_3 = 3$.

The idea behind this is that the largest $\alpha$ parameter corresponds to the element in $P_{TQA}(t)$ or $P_{BPOS}(t)$ that should be large for the given rig state. For instance, $\gamma_t$=PoohPumpRot implies the rotation mode should be ROT and the block movement mode should be DOWN, so the second element of $P_{TQA}(t)$ (corresponding to $P_{ROT}$) should be large, and the third element of $P_{BPOS}(t)$ (corresponding to $P_{down}$) should be large. This is reflected in the likelihood specifications above where for $p(P_{TQA}(t)|\gamma_t$=PoohPumpRot) $\alpha_2$ is large, and for $p(P_{BPOS}(t)|\gamma_t$=PoohPumpRot) $\alpha_3$ is large. Also it is important that the non-large $\alpha$'s are set identically to 1 because if they are not then (for example) $p(P_{TQA}(t)$=[1 0]|$\gamma_t$)=0. The event $P_{TQA}(t)$=[1 0] means that the changepoint detector is certain that the TQA mode is on, so it should not be the case that the likelihood of this event is 0. However, if the above specification is used the likelihood is at its maximum for $P_{TQA}(t)$ =[1 0].

To compute the rig state probabilities the following algorithm is employed, and it is assumed that the changepoint detection algorithms are operating and outputting their probability synopses.

Set $Z_0$=[1 1 1 1 1 1 ]/ 6.
For t=1,2, ...
  Set $z_t$=$z_{t-1}\Pi$ and k=1.
  For each i∈{PoohPumpRot,PoohPump, ... ,staticPump}
    Set $z_t(k) \leftarrow z_t(k) \times p(P_{TQA}(t)|\gamma_t$=i)$\times p(P_{BPOS}(t)|\gamma_t$=i).
    Set k←k+1.
  End for.
  Set z=$z_t$(1)++$z_t$(6), then set $z_t(k) \leftarrow z_t(k)/Z$ for k=1, ..., 6.
End for.

At the end of each iteration $z_t$ is a 6-vector containing estimates of the probability for the six rig states conditional on the sensor data up to time t.

According preferred embodiments of the invention, the automatically detected rig state information is used as part of a larger system for event detection. In particular, it has been found that the ability to diagnose certain drilling problems is greatly improved by incorporating the automatically detected rig state.

According to one embodiment, an improved diagnostic tool for detecting problems associated with stuck pipe is provided. The tool preferable builds on a known diagnostic tool such as SPIN doctor™ from Schlumberger. The known tool queries the drill rig personnel about the rig state when the pipe became stuck. See *Managing Drilling Risk*, Aldred et al. Oilfield Review, summer 1999, at page 11. According to the invention, the diagnostic tool, such as SPIN-DR, is modified to take the input directly from the automatic rig state detection system as described above to greatly improve and automate the detection of the onset of pipe sticking.

Figure 9:
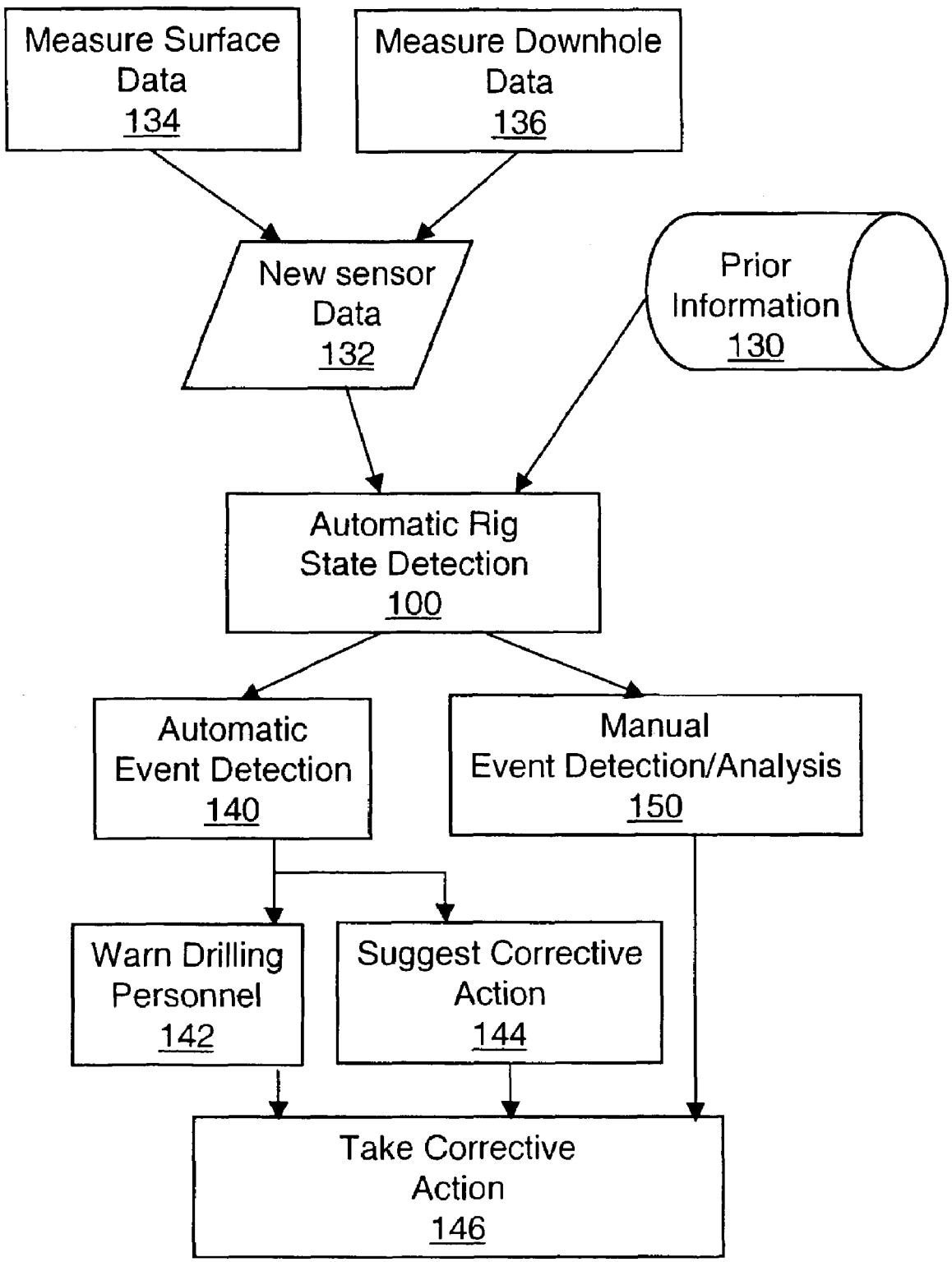
FIG. 9 shows steps involved in an improved system for event detection, according to preferred embodiments of the invention.

FIG. 9 shows steps involved in an improved system for event detection, according to preferred embodiments of the invention. In step 134, measured surface data are received or sensed. Examples include hookload, block position or velocity, standpipe pressure, torque, as well as detected inputs such as the "bit on bottom" and "in slips" indicators from system such as IDEAL™. In step 136, measured downhole data are received, such as MWD or LWD data. In step 132, the data are inputted to the automatic rig state detection system 100, such as described above with reference to FIG. 8. As described in FIG. 8, prior information is also inputted to the rig state detection system 100. From the detection system 100 the rig state information (which is preferably in the form of a probability) is inputted into event detection systems. In step 140, the rig state information is inputted into an automatic event detection system, such as SPIN-DR used for stuck pipe detection as described above.

In general, in step 140, the automatic event detection can be greatly improved through the use of automatic rig state detection. Preferably, in step 140, the rig state information is used to apply different variations of the event detection algorithm depending on the particular rig state. If the event detection is based on threshold parameters, the threshold levels could be set optimally for each rig state, thereby significantly reducing the false positives (e.g. false alarms) and false negative of the event detector. However, as an alternative to threshold based techniques, event detection preferably calculates the probability that the event has occurred or will do shortly. If an alarm is to be raised, this is preferably a threshold on the calculated probability.

In step 142, in the case of the stuck pipe detector, when a stuck pipe is indicated by the improved SPIN-DR system, the drilling personnel are warned. In step 146 the drilling personnel take corrective action in light of the warning in step 142. In the case of a stuck pipe warning For example, the warning for stuck pipe preferably includes the diagnosed cause such as "undergauge hole." Alternatively, in step 144, instead of a warning, the system suggests corrective action to the drilling personnel. For example, if the diagnosis is "undergauge hole", the suggested corrective action could be to "spot an oil based mud pill".

Another example of an improved event detection system, according to a preferred embodiment of the invention, is an improved washout detection system. According to this embodiment, the following additional steps are performed. Determine the relationship between pump pressure and mud flow rate for the rig states where pumping is occurring. Calculate surface flow rate from surface data collected at the pumping system. Calculate downhole flow rate from MWD turbine assembly. Compare the surface and downhole flow rates within like states. For example, the calculations for PoohPumpRot and DrillSlide are preferably performed separately. If a discrepancy appears between surface and downhole flow rate among like states, a washout event is indicated. For further detail about washout detection see, Schlumberger Drilling and Measurements overview flier entitled "Washout Alarm" (http://www.hub.slb.com/Docs/DandM/GraphicsFolder/DM_Over views/Washout_alarm-.pdf) hereby incorporated by reference. Referring to FIG. 9, the washout detection system is an example of an automatic event detection system step 140. In the case of a washout indication, a warning is made to the drilling personnel in step 142. The corrective action taken in step 146 could be tripping out and inspecting the pipe tool joints for the washout.

Another example of an improved event detection system, according to a preferred embodiment of the invention is an improved bit wear detection system using mechanical efficiency analysis. Mechanical efficiency analysis techniques for detecting bit wear are known. See, U.S. Pat. No. 4,685,329, and "Measuring the Wear of Milled Tooth Bits Using MWD Torque and Weight-on-Bit" Burgess and Lesso, SPE/IADC 13475, both hereby incorporated herein by reference. According to the invention, an improved bit wear detection system is provided by separating the data into different cases based on the state of the rig: (1) rotary drilling (DrillRot), (2) sliding drilling (DrillSlide), and (3) other states. The data from the non drilling states (other states) is ignored. The data for rotary drilling and slider drilling are then analysed separately, by fine tuning the torque and weight relationships for each case. The different analysis preferably make use of the fact that since the downhole torque sensor is typically positioned above the mud motor, while rotary drilling the direct torque is sensed, and during sliding drilling, the reactive torque is sensed.

According to another example of step 140, the data extracted from a drilling acquisition system such as Schulmberger's IDEAL™ technology is automatically extracted according to rig state. See U.S. Pat. No. 6,438,495, hereby incorporated by reference. In this case, all the data is automatically separated into DrillSlide, DrillRot, and the other states. Operational parameters are selected for like states and BHA direction tendency analysis is thereby automated.

According to another example of step 140, an improved event detection system is based on torque and drag analysis. Commercially available torque and drag analysis software such as DrillSAFE™ part of Schlumberger DrillingOffice™ or DeaDrag8™ from Drilling Engineering Assocation is preferable modified to automatically accept rig state information to determine which mode of torque and drag analysis to run. This automation allows a continuous modeling of drill string tensile and torque measurements. The comparison of these modeled data to the actual measurements allows multiple forms of event detectors such as stuck pipe, hole cleaning problems, twist off, and sloughing shales.

According to another example of step 140, a swab/surge detection system is provided. In general a drill bit has almost the same diameter as the borehole itself, so when raising a drill string, the bit acts like a piston and the pressure of the mud below the bit is reduced. This swab pressure can allow reservoir fluids to enter the wellbore if the drill string is raised too quickly, which may lead to a kick or a blowout. Conversely, as the string is lowered, the pressure of the mud below the bit is increased. This surge pressure can fracture the formation, leading to mud loss and wellbore stability problems. At each point along the wellbore, the maximum safe surge pressure and the minimum safe swab pressure can be calculated e.g. from an earth model. Downhole pressure can be measured directly or modeled. The detection system for detects dangerous swab and surge pressures by first detecting the state of the drilling rig, and acquires downhole pressure and drill bit depth measurement data. If at any point along the wellbore the maximum/minimum safe threshold pressure for the detected state has been or is about to be exceeded, the warns the driller of the situation and preferably suggests that the drill string velocity be reduced.

According to another embodiment of the invention, manual analysis of measured data is improved through the use of automatic rig state information. Referring to FIG. 9, in step 150, automatic rig state information is used to improve manual event detection. According to the invention, in step 150 the most probable rig state is plotted alongside other data channels, thereby helping to focus the attention of an engineer looking at MWD/LWD logs for formation evaluation or drilling events. The state preferably is not displayed when the state uncertainty exceeds a predefined limit.

An example of step 150 is avoiding excessive vibrations in the drillstring. MWD downhole shock measurements are monitored, sometimes remotely, to determine if the BHA/drillstring is about to go into one of several destructive vibration modes such as: stick/slip, lateral resonance, forward, chaotic, and backward whirl. This process involves manually performed pattern recognition and is greatly improved by the use of rig state information.

According to another embodiment of the invention, the automatically detected events and the state(s) during which they occurred are fed directly into a knowledge base such as the commercially used software known as RiskTRAK™ from Schlumberger. Additionally, risks identified within RiskTRAK™ are used as inputs to the automatic rig state detectors. In particular the identified risks are used to alter the prior probabilities of the event detection algorithms.

Figure 10:
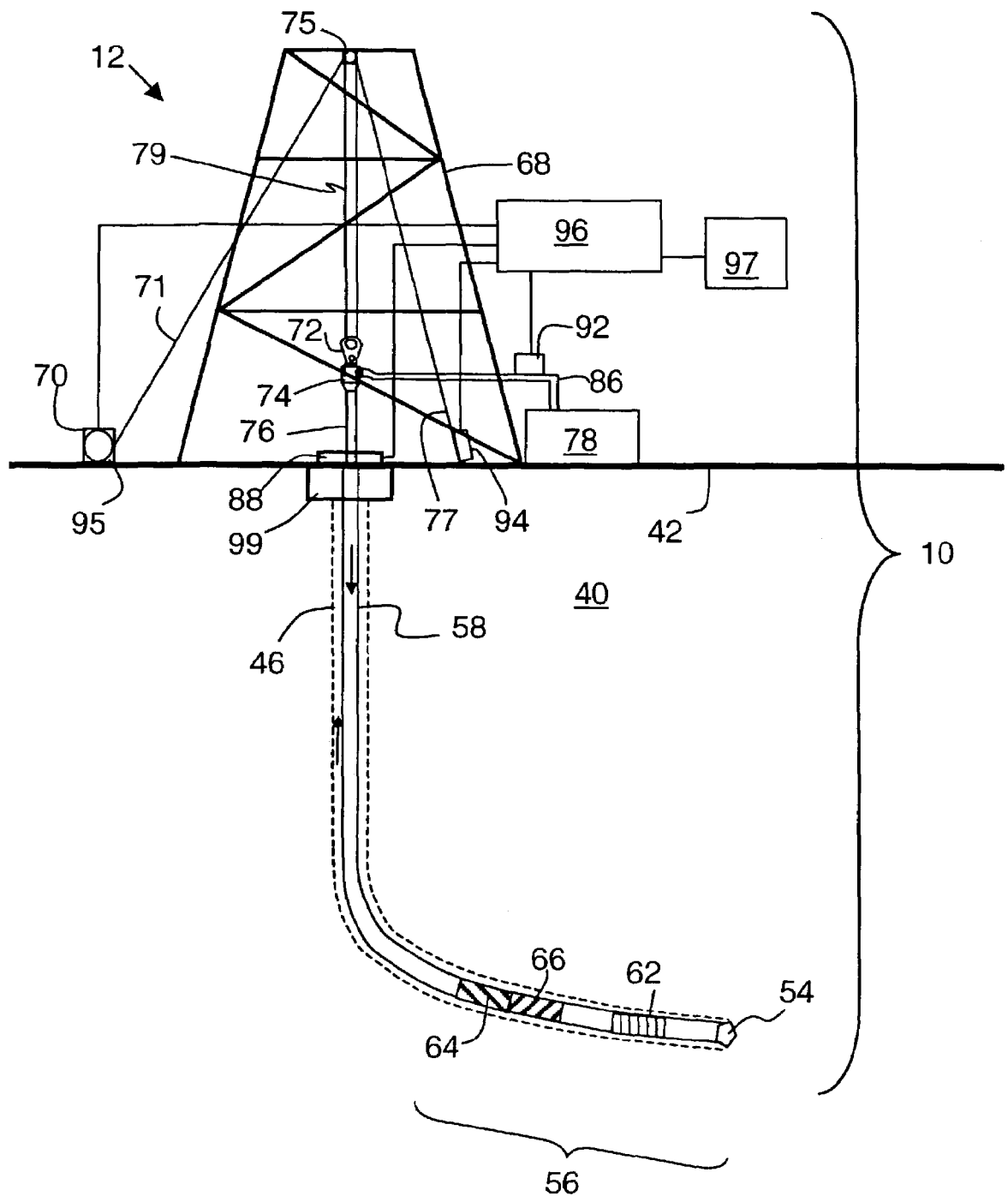
FIG. 10 shows a drilling system 10 using automatic rig state detection, according to preferred embodiments of the invention.

FIG. 10 shows a drilling system 10 using automatic rig state detection, according to preferred embodiments of the invention. Drill string 58 is shown within borehole 46. Borehole 46 is located in the earth 40 having a surface 42. Borehole 46 is being cut by the action of drill bit 54. Drill bit 54 is disposed at the far end of the bottom hole assembly 56 that is attached to and forms the lower portion of drill string 58. Bottom hole assembly 56 contains a number of devices including various subassemblies. According to the invention measurement-while-drilling (MWD) subassemblies are included in subassemblies 62. Examples of typical MWD measurements include direction, inclination, survey data, downhole pressure (inside the drill pipe, and outside or annular pressure), resistivity, density, and porosity. Also included is a subassembly 60 for measuring torque and weight on bit. The signals from the subassemblies 62 are preferably processed in processor 66. After processing, the information from processor 66 is then communicated to pulser assembly 64. Pulser assembly 64 converts the information from processor 66 into pressure pulses in the drilling fluid. The pressure pulses are generated in a particular pattern which represents the data from subassemblies 62. The pressure pulses travel upwards though the drilling fluid in the central opening in the drill string and towards the surface system. The subassemblies in the bottom hole assembly 56 can also include a turbine or motor for providing power for rotating and steering drill bit 54.

The drilling rig 12 includes a derrick 68 and hoisting system, a rotating system, and a mud circulation system. The hoisting system which suspends the drill string 58, includes draw works 70, fast line 71, crown block 75, drilling line 79, traveling block and hook 72, swivel 74, and deadline 77. The rotating system includes kelly 76, rotary table 88, and engines (not shown). The rotating system imparts a rotational force on the drill string 58 as is well known in the art. Although a system with a Kelly and rotary table is shown in FIG. 4, those of skill in the art will recognize that the present invention is also applicable to top drive drilling arrangements. Although the drilling system is shown in FIG. 4 as being on land, those of skill in the art will recognize that the present invention is equally applicable to marine environments.

The mud circulation system pumps drilling fluid down the central opening in the drill string. The drilling fluid is often called mud, and it is typically a mixture of water or diesel fuel, special clays, and other chemicals. The drilling mud is stored in mud pit 78. The drilling mud is drawn in to mud pumps (not shown), which pumps the mud though stand pipe 86 and into the kelly 76 through swivel 74 which contains a rotating seal. In invention is also applicable to underbalanced drilling. If drilling underbalanced, at some point prior to entering the drill string, gas is introduced into drilling mud using an injection system (not shown).

The mud passes through drill string 58 and through drill bit 54. As the teeth of the drill bit grind and gouges the earth formation into cuttings the mud is ejected out of openings or nozzles in the bit with great speed and pressure. These jets of mud lift the cuttings off the bottom of the hole and away from the bit, and up towards the surface in the annular space between drill string 58 and the wall of borehole 46.

At the surface the mud and cuttings leave the well through a side outlet in blowout preventer 99 and through mud return line (not shown). Blowout preventer 99 comprises a pressure control device and a rotary seal. The mud return line feeds the mud into separator (not shown) which separates the mud from the cuttings. From the separator, the mud is returned to mud pit 78 for storage and re-use.

Various sensors are placed on the drilling rig 10 to take measurement of the drilling equipment. In particular hookload is measured by hookload sensor 94 mounted on deadline 77, block position and the related block velocity are measured by block sensor 95 which is part of the draw works 70. Surface torque is measured by a sensor on the rotary table 88. Standpipe pressure is measured by pressure sensor 92, located on standpipe 86. Signals from these measurements are communicated to a central surface processor 96. In addition, mud pulses traveling up the drillstring are detected by pressure sensor 92. Pressure sensor 92 comprises a transducer that converts the mud pressure into electronic signals. The pressure sensor 92 is connected to surface processor 96 that converts the signal from the pressure signal into digital form, stores and demodulates the digital signal into useable MWD data. According to various embodiments described above, surface processor 96 is programmed to automatically detect the most likely rig state based on the various input channels described. Processor 96 is also programmed carry out the automated event detection as described above. Processor 96 preferably transmits the rig state and/or event detection information to user interface system 97 which is designed to warn the drilling personnel of undesirable events and/or suggest activity to the drilling personnel to avoid undesirable events, as described above.

Figure 11:
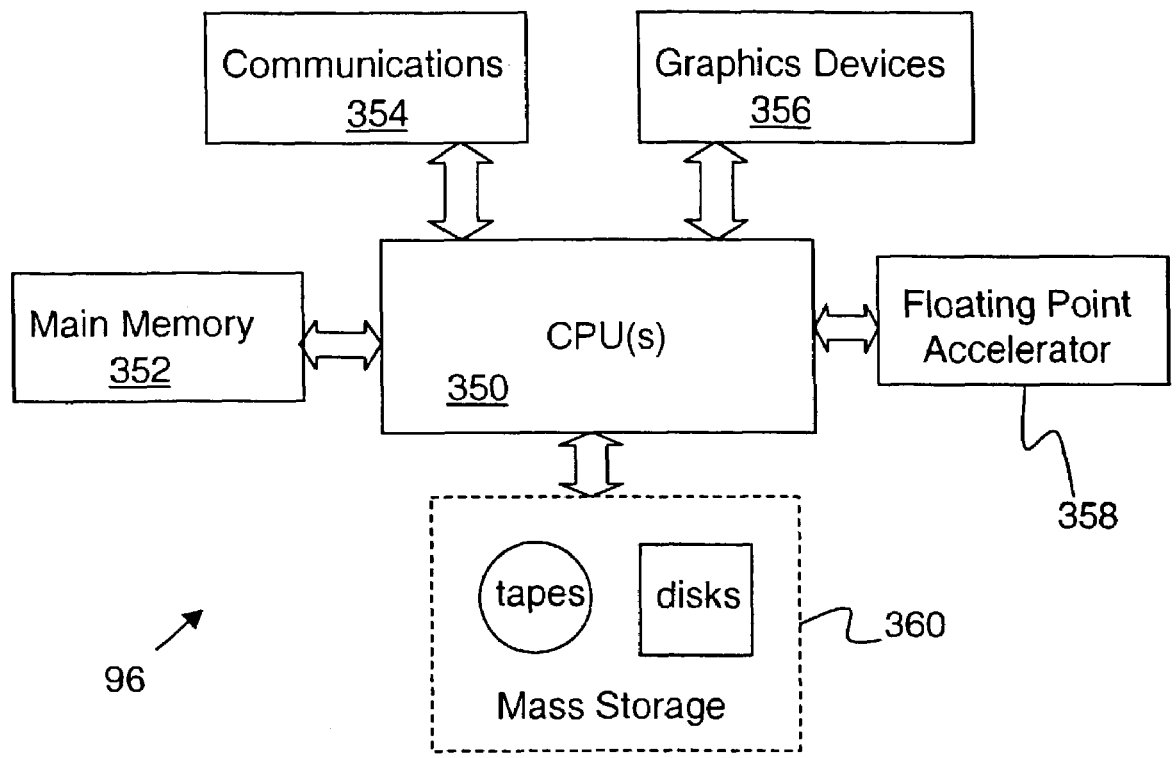
FIG. 11 shows further detail of a suitable processor, according to preferred embodiments of the invention.

FIG. 11 shows further detail of processor 96, according to preferred embodiments of the invention. Processor 96 preferably consists of one or more central processing units 350, main memory 352, communications or I/O modules 354, graphics devices 356, a floating point accelerator 358, and mass storage such as tapes and discs 360.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A method for drilling while automatically detecting the state of a drilling rig during the drilling process of a wellbore comprising the steps of:
   receiving two or more independent input data channels, each input data channel representing a series of measurements made over time during the drilling process; and
   automatically detecting the most likely state of the drilling rig from at least three possible rig states, the detection based on the two or more input channels, wherein the step of automatically detecting further comprises generating a probability associated with each possible rig state, and wherein said generating said probability associated with each possible rig state includes using transitional probabilities for state-to-state transitions for the purpose of calculating said probability.

2. A method according to claim 1 further comprising the step of altering activity relating to drilling based on the detection of the most likely state of the drilling rig.

3. A method according to claim 1 further comprising the step of investigating data relating to the drilling process and/or characteristics of the earth surrounding the wellbore collected during the drilling process.

4. A method according to claim 1 wherein the two or more input data channels are represent measurements of equipment on the drilling rig.

5. A method according to claim 1 wherein the two or more input data channels include two or more of the following input channels: hookload, block position, torque, and stand pipe pressure.

6. A method according to claim 1 wherein the step of receiving includes at least three independent input channels and the detection is based on the at least three input channels.

7. A method according to claim 5 wherein the step of receiving includes at least four independent input channels and the detection is based on the at least four input channels.

8. A method according to claim 1 further comprising the step of predicting a future rig state based in part on a current rig state.

9. A method according to claim 1 wherein the most likely state is detected from at least four possible rig states.

10. A method according to claim 1 wherein the most likely state is detected from at least six possible rig states.

11. A method according to claim 1 wherein the most likely state is detected from at least 10 possible rig states.

12. A method according to claim 1 wherein the at least three possible rig states include three or more of the following rig states: Rotary mode drilling (DrillRot), Slide mode drilling (DrillSlide), Reaming in (RihPumpRot), Sliding in (RihPump), Tripping in (Rih), Reaming out (PoohPumpRot), Sliding out (PoohPump), Tripping out (Pooh), Circulating and rotating (StaticPumpRot), Circulating (StaticPump), Off bottom (Static), InSlips, and Unclassified.

13. A method according to claim 1 wherein the step of automatically detecting makes use of a fuzzy logic algorithm.

14. A method according to claim 1 wherein the step of automatically detecting makes use of a probabilistic technique.

15. A method according to claim 1 wherein the step of automatically detecting make use of a Bayesian technique.

16. A method according to claim 1 wherein the step of automatically detecting make use of a sequential Bayesian technique.

17. A method according to claim 1 wherein a particle filtering technique is used in the step of automatic detection.

18. A method according to claim 1 wherein a parametric particle filtering technique is used in the step of automatic detection.

19. A method according to claim 1 wherein the most likely state of the drilling rig is detected by calculating a probability distribution of the possible rig states using a probabilistic model, the probabilistic model being based on changepoints and parameters between the changepoints, where the changepoints are derived from the two or more input channels.

20. A method according to claim 19 wherein the changepoints are detected separately for each input channel.

21. A method according to claim 20 wherein the changepoints are detected using a sequential Bayesian technique.

22. A method according to claim 1 wherein a Kalman filtering technique is used in the step of automatic detection.

23. A method according to claim 1 wherein the step of automatically detecting is based at least in part on binary indicators from a drilling acquisition system.

24. A method according to claim 23 wherein the binary indicators include bit on bottom, and bit not on bottom.

25. A method according to claim 23 wherein the binary indicators include in slips, not in slips.

26. A method according to claim 1 further comprising the step of detecting a drilling event based at least in part on (i) the automatically detected most likely state of the drilling rig, and (ii) other information.

27. A method according to claim 26 wherein said step of detecting a drilling event is performed automatically.

28. A method according to claim 27 wherein the drilling event being detected is a washout.

29. A method according to claim 27 wherein the drilling event being detected is a stuck pipe.

30. A method according to claim 27 wherein the drilling event being detected is a predetermined level of bit wear.

31. A method according to claim 27 wherein the step of detecting a drilling event involves tendency analysis.

32. A method according to claim 27 wherein the step of detecting a drilling event involves torque and drag analysis.

33. A method according to claim 27 further comprising the step of notifying drilling personnel of the detected event.

34. A method according to claim 33 wherein the detected event is undesirable, and the notification is a warning of the undesirable event.

35. A method according to claim 27 further comprising the step of suggesting to drilling personnel a response to the detected event.

36. A method according to claim 27 wherein the event is detected in part using information from an earth model.

37. A method according to claim 26 wherein the step of detecting a drilling event involves comparing values derived from the other information with threshold values, and different threshold values are used depending upon the automatically detected most likely state.

38. A method according to claim 26 wherein the detecting of the drilling event is in part a manual process.

39. A method according to claim 26 wherein the other information includes MWD data.

40. A method according to claim 39 wherein the event detected is destructive vibration modes.

41. A method according to claim 1 wherein the automatic detection is based in part on knowledge base information.

42. A method according to claim 1 wherein said steps of receiving and automatically detecting are repeated such that the most likely states of drilling rig is detected over a period of time.

43. A system for drilling while automatically detecting the state of a drilling rig during the drilling process of a wellbore comprising:
   a storage system adapted to receive two or more independent input data channels, each input data channel representing a series of measurements made over time during the drilling process; and
   a processing system adapted and programmed to automatically detect the most likely state of the drilling rig from at least three possible rig states and to calculate a probability associated with each possible rig state, the detection based on the two or more inputs, wherein said calculating the probability associated with each possible rig state includes using transitional probabilities for state-to-state transitions for the purpose of calculating said probability.

44. A system for drilling according to claim 43 further comprising a user interface to display information based on the detected most likely state of the drilling rig to drilling personnel such that drilling activity can be altered.

45. A system for drilling according to claim 44 wherein the two or more input data channels are configured to communicate measurements of equipment on the drilling rig.

46. A system for drilling according to claim 43 wherein the storage system is adapted to receive at least three independent input channels and the detection is based on the at least three input channels.

47. A system for drilling according to claim 43 wherein the processing system is further adapted and programmed to generate separate probabilities associated with each possible rig state, and detection of future rig states is based in part on a current rig state probability.

48. A system for drilling according to claim 43 wherein the processing system detects the most likely state of the drilling rig using a probabilistic technique.

49. A system for drilling according to claim 48 wherein the probabilistic technique includes a sequential Bayesian technique based on particle filtering.

50. A system for drilling according to claim 48 wherein the processing system detects the most likely state of the drilling rig by calculating a probability distribution of the possible rig states using a probabilistic model, the probabilistic model being based on changepoints and parameters between the changepoints, where the changepoints are derived from the two or more input channels.

51. A system for drilling according to claim 50 wherein the changepoints are detected separately for each input channel.

52. A system for drilling according to claim 51 wherein the changepoints are detected using a sequential Bayesian technique.

53. A system for drilling according to claim 43 wherein the processing system is further adapted and programmed to detect a drilling event based at least in part on (i) the automatically detected most likely state of the drilling rig, and (ii) other information.

54. A system for drilling according to claim 53 wherein the detecting of a drilling event is performed automatically.

55. A system for drilling according to claim 54 wherein the detecting of a drilling event is in part performed using information from an earth model.

56. A system for drilling according to claim 43, further comprising a user interface configured to display the probability of at least one of said rig states.

57. A system for drilling according to claim 43, further comprising a user interface configured to display the transitional probability associated with the state-to-state transition.

58. A computer readable medium capable of causing a computer system to carry out the following steps during a drilling process of a wellbore:
   receiving two or more independent input data channels, each input data channel representing a series of measurements made over time during the drilling process;
   automatically detecting the most likely state of the drilling rig from at least three possible rig states, the detection based on the two or more input channels, wherein automatically detecting the most likely state comprises calculating a probability of at least one of said rig states, and wherein said calculating the probability of at least one of said rig states includes using a transitional probability associated with a state-to-state transition for the purpose of calculating said probability; and
   displaying information based on the detected most likely state of the drilling rig to drilling personnel such that drilling activity can be altered.

59. A computer readable medium according to claim 58 further capable of causing the computer system to carry out the step of altering activity relating to drilling based on the detection of the most likely state of the drilling rig.

60. A computer readable medium according to claim 58 wherein the detection is based on at least three input channels.

61. A computer readable medium according to claim 58 wherein the probability of at least one of said rig states is generated by the computer system.

62. A computer readable medium according to claim 58 wherein the computer system detects the most likely state of the drilling rig using a probabilistic technique.

63. A computer readable medium according to claim 62 wherein the probabilistic technique includes a sequential Bayesian technique based on particle filtering.

64. A computer readable medium according to claim 62 wherein the probabilistic technique includes analyzing changepoints and parameters for segments between the changepoints derived from the two or more input channels.

65. A computer readable medium according to claim 58 wherein the computer system is further caused to detect a drilling event based at least in part on (i) the automatically detected most likely state of the drilling rig, and (ii) other information.

66. A computer readable medium according to claim 58 wherein the detecting of a drilling event is performed automatically.

67. A method for drilling while automatically detecting the state of a drilling rig during the drilling process of a wellbore comprising the steps of:
   receiving two or more independent input data channels, each input data channel representing a series of measurements made over time during the drilling process; and
   automatically detecting the most likely state of the drilling rig from at least three possible rig states, the detection based on the two or more input channels, wherein the step of detecting further comprises the step of calculating a probability of at least one of said rig states including the use of transitional probabilities assigned to each state-to-state transition for the purpose of calculating said probability.

* * * * *